(12) United States Patent
Yoshida et al.

(10) Patent No.: US 6,219,156 B1
(45) Date of Patent: *Apr. 17, 2001

(54) IMAGE DATA PROCESSING DEVICE AND DIGITAL COPYING MACHINE WHICH VARY AMOUNT OF IMAGE DATA TO BE COMPRESSED DEPENDING ON TIME USED FOR COMPRESSION

(75) Inventors: Eiichi Yoshida; Takeshi Morikawa, both of Toyokawa (JP)

(73) Assignee: Minolta Co., Ltd., Osaka (JP)

(\*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/729,255

(22) Filed: Oct. 9, 1996

(30) Foreign Application Priority Data

Oct. 9, 1995 (JP) .................................................. 7-261335
Nov. 30, 1995 (JP) .................................................. 7-311809

(51) Int. Cl.$^7$ .................................................. H04N 1/411
(52) U.S. Cl. .................. 358/261.4; 358/426; 358/444; 358/404
(58) Field of Search .................................. 358/404, 444, 358/426, 427, 261.2, 430, 261.4, 433, 453, 412, 1.15, 1.14, 1.16, 1.9; 395/114–116, 109, 112; 582/239

(56) References Cited

U.S. PATENT DOCUMENTS 5,333,057 * 7/1994 Morikawa et al. ................... 358/296
5,517,331 * 5/1996 Murai et al. .......................... 358/412
5,710,638 * 1/1998 Yamamoto et al. .................. 358/404
5,771,340 * 6/1998 Nakazato et al. .................... 395/112
5,798,843 * 8/1998 Yamamoto et al. .................. 358/404

FOREIGN PATENT DOCUMENTS 7-32459  10/1995  (JP) .

\* cited by examiner

Primary Examiner—Cheukfan Lee
(74) Attorney, Agent, or Firm—McDermott, Will & Emery

(57) ABSTRACT

An image data processing device, wherein an input image memory for temporarily storing the digital image data representing pixels stores the image data serially supplied from an upstream device in order of input, and reading and compressing of a specified quantity of the image data already stored in the input image memory are performed in parallel with storing of new image data every time the specified quantity of image data is stored in the input image memory. A digital copying machine including an image memory for storing image data from an image reader, allowing setting of an input image memory area, and provided with an image holding memory area, and being operable such that, at the start of input of the image data into the input image memory, the input image memory area is set in accordance with a maximum size of the original, that the original size is detected from the stored image data, that an unnecessary storage image area is deleted, and necessary image area data is transferred to the image holding memory area, when the original size is detected.

12 Claims, 27 Drawing Sheets

Compressed Data Management Table T1

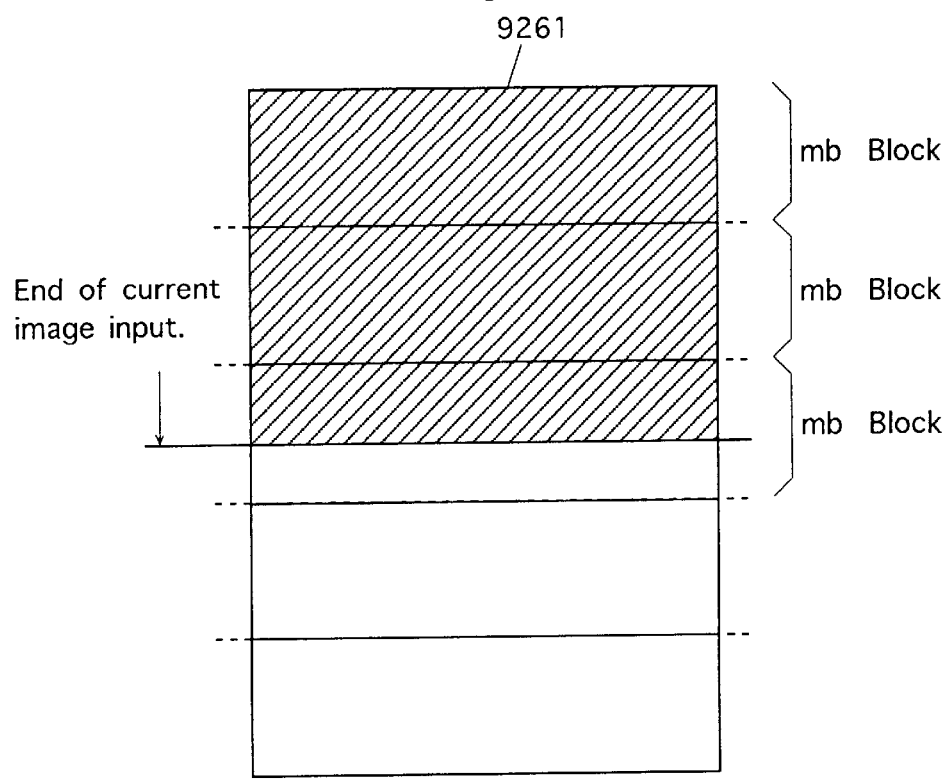
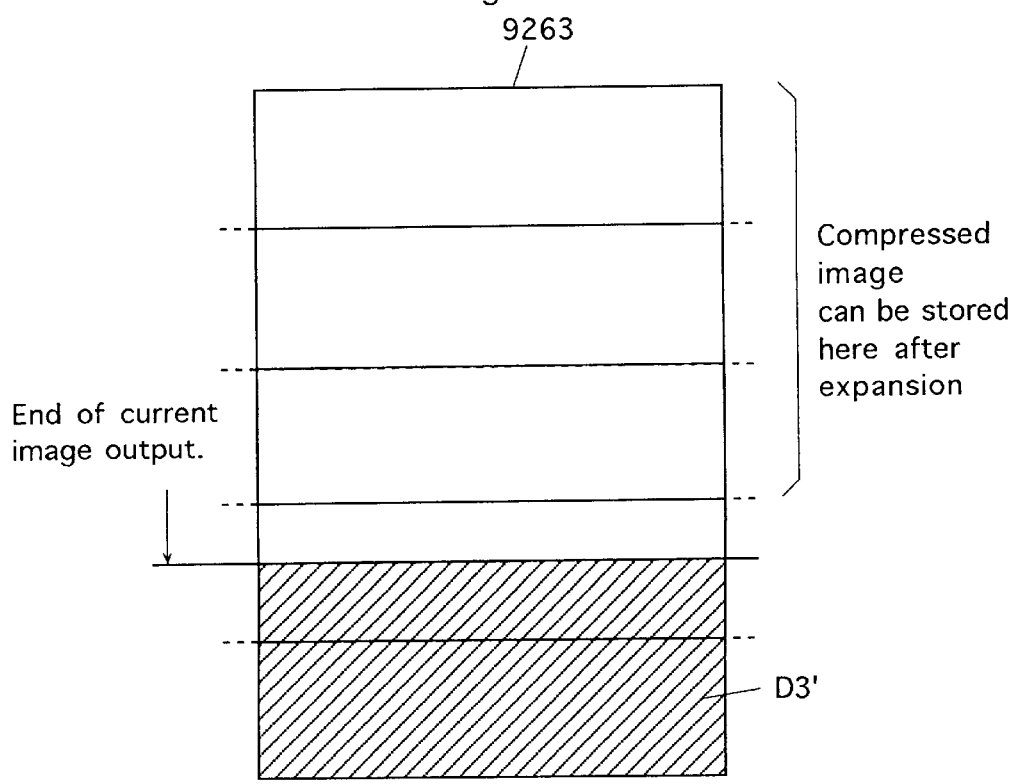

changing lateral size

IMAGE DATA PROCESSING DEVICE AND
DIGITAL COPYING MACHINE WHICH
VARY AMOUNT OF IMAGE DATA TO BE
COMPRESSED DEPENDING ON TIME USED
FOR COMPRESSION

BACKGROUND OF THE INVENTION

1. Field of the Invention

The present invention relates to image data processing devices, which are arranged in digital copying machines, facsimiles and others for compressing image data supplied serially in the bit map format, and also relates to digital copying machines equipped with image memories for storing image data obtained by reading originals with image readers.

2. Description of the Background Art

Digital copying machines can perform copying in the memory mode. In this mode, image information produced by reading an original with an image reader is temporarily stored in an image memory, and a copy image is produced based on the data in the image memory. In the multi-copy processing in the memory mode, an operation of reading an original is required only one time regardless of the number of copies to be produced. Therefore, a copy time, i.e., a time required for copying can be remarkably reduced in the memory mode, if reading of the original requires a longer time than printing. Electronic sort is an application of this memory mode copying. According to the electronic sort, image information is read from a plurality of originals for storing the same in the image memory, and a plurality of sets of copied documents are individually produced by repeating an operation of successively reading out image information of the originals from the memory.

In general, the image memory has stored image information in a compressed format, which will be referred to as "compressed data" hereinafter. The purpose of compression is to increase the number of originals which can be stored. In the conventional copying machine, the image data representing pixels, which are obtained by scanning and reading the original with the image reader, is stored in the image memory in order of arrangement of the pixels, and a compressing operation starts after the image data for one page, i.e., image data corresponding to one sheet of original, is completely stored. Thus, the compressing operation is performed page by page. Scanning for the next original starts after the compression of image data for the last page is completed.

In the copying machine, in which original image data read with the image reader as described above is temporarily stored in the image memory, a copying time is longer by a time required for access to the image memory than that in a so-called analog copying machine, in which image information is directly transferred from an image reader to a printing means, when only one copy is to be produced from one original, i.e., in general copying processing. Thus, the copying speed decreases. Particularly in the structure where image data is compressed for storing the same in the image memory, a time for compression and expansion is additionally required, which further increases a copying time.

In some digital copying machines in which a read original image is temporarily stored in the image memory, a size of an original is first detected to determine a size of an input image memory area in the image memory, and the image data is read into the input image memory area. Also, such digital copying machines have been developed that image data is read into the memory without detecting the size of original, and the size of original is detected from the image data on the memory.

However, in this digital copying machine, in which image data is read into the image memory and the size of original is detected from the image data on the memory, the size of original is not initially determined, so that the memory area of the image memory for reading image data must be set to correspond to the maximum size of original which is readable by the image reader.

As a result, even if the actual size of the original is small and therefore the required input image memory area of the image memory is small, the maximum memory area must be initially prepared for reading the image, resulting in a low efficiency of memory use.

In the structure where an image read onto the input image memory area is held in a compressed format by an image holding memory area, the image stored in the input image memory area which has been set correspondingly to the maximum original size must be compressed together with an unnecessary image area which does not correspond to the original, so that the compression time and therefore expansion time after compression unnecessarily increase.

SUMMARY OF THE INVENTION

Accordingly, it is an object of the invention to provide an image data processing device used in a digital copying machine or the like, in which image data produced by reading an original with an image reader is temporarily stored in an image memory, and which can improve a use efficiency of the image memory.

Another object of the invention is to provide an image data processing device used in a digital copying machine or the like, in which image data produced by reading an original with an image reader is temporarily stored in an image memory, and which can reduce a time required from start of input of image data for one page of image to completion of compressing the same in order to increase an operation speed of image data processing for compressing the image data supplied to the image memory.

Still another object of the invention is to provide a digital copying machine, in which image data produced by reading an original with an image reader is temporarily stored in an image memory, and which can reduce a required time from start of input of the image data for one page of image to completion of compressing the same in order to increase an operation speed of image data processing for compressing the image data supplied to the image memory.

Yet another object of the invention is to provide a digital copying machine, in which image data produced by reading an original with an image reader is temporarily stored in an image memory, and in which the image memory can be effectively utilized in accordance with sizes of an original.

Further another object of the invention is to provide a digital copying machine, in which an image read onto the image memory is held in a compressed format, and a time for image compression and therefore a time for expansion after the compression can be reduced.

In order to achieve the above objects, the invention provides an image data processing device comprising:

an input image memory for temporarily storing digital image data representing pixels;

writing means for storing the image data serially supplied from an upstream unit to the input image memory in order of input;

reading means for performing reading of a specified quantity of the image data already stored in the input image memory in parallel with storing of new image data by the writing means every time the specified quantity of image data is stored in the input image memory; and image compressing means for compressing the image data read by said reading means.

The above image data processing device according to the invention can be applied to machines such as a digital copying machine and a facsimile machine which transfer data of a read original image data in a compressed format. The upstream unit described above may be an image reader for reading the image. It may also be drawing device which performs bitmap development of character data, graphics data or others.

According to the above image data processing device of the invention, image data is successively supplied from the upstream unit into the input image memory. When the specified quantity of data is supplied to the input image memory, the specified quantity of image data is successively read by the reading means and is compressed by the image compressing means. During this, input of the image data into the input image memory continues in parallel to the compression. When the specified quantity of image data is supplied to the input image memory, this specified quantity of image data is compressed in a similar manner.

Generally, the specified quantity is smaller than the whole quantity of image data. For example, when the image data is produced from an original of one page, if the specified quantity is smaller than a quantity for one page, input of the image data into the input image memory can be performed in parallel to compression of the image data already input. Therefore, a time required from start of the image data input to completion of compressing the whole image data can be shorter than that in the case where compression of the image data for one page is performed after the image data for one page is completely input into the input image memory.

In order to achieve the above objects, the present invention provides a digital copying machine (of a first type) provided with the image data processing device described above. In this case, the upstream unit may be an image reader for reading the original image.

In order to achieve the above objects, the present invention also provides a digital copying machine (of a second type), comprising:

an image memory for storing image data obtained by reading an original with an image reader, allowing setting of an input image memory area for storing the supplied image data, and provided with an image holding memory area capable of holding a plurarity of image data;

means for setting the input image memory area in the image memory in accordance with a maximum size of the original readable by the image reader;

means for detecting an original size from the image data stored in the input image memory area and starting detection of the original size upon start of storage of the image data or during the storage;

means for changing the input image memory area already set correspondingly to the maximum original size in accordance with the original size detected by the means for detecting the original size; and input image transferring means for transferring the image data from the input image memory area to the image holding memory area, wherein the input image transferring means being operable to delete an unnecessary storage image area in the input image memory area not required for the detected original size, and transfer necessary image area data from the input image memory area to the image holding memory area, when the original size detecting means detects the original size.

According to the digital copying machine of the second type of the invention, the input image memory area in the image memory for the image data storage is initially set correspondingly to the maximum original size, which is readable by the image reader, by the input image memory area setting means, and then the image data obtained by reading the original with the image reader starts to be stored into the input image memory area. The original size detecting means starts detecting the size of the original upon start of storage of the image data or during the storage of the same (e.g., if the input image memory area is set band by band, when the image data of one or more band units are stored).

When the original size detecting means detects the original size, the input image memory area which has been set in accordance with the maximum original size is changed correspondingly to the detected original size by the input image memory area changing means, and thereby the unnecessary memory area is released, which allows effective utilization of the image memory for another purpose.

When the original size detecting means detects the original size, the unnecessary storage image area in the input image memory area which is not required for the detected original size is deleted, and image data in the necessary image area is transferred from the input image memory area to the image holding memory area. By deleting the unnecessary image area in this manner, the image compression time and therefore the expansion time after the compression do not unnecessarily increase in the structure holding the image in the compressed format.

Detection of the original size by the original size detecting means may be performed for detecting a lateral size of the original (i.e., size in a primary scanning direction of original scanning by the image reader) and a longitudinal size (i.e., a secondary scanning (sub scanning) direction of the original scanning by the image reader), if the original is of an ordinary square shape. In this case, the lateral size may be detected before detection of the longitudinal size. Change of the input image memory area corresponding to the original sizes is performed based on both the lateral and longitudinal sizes of the original.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a schematic diagram showing partitions in an input image memory area;

FIG. 6 shows an example of a state of an output image memory area;

DESCRIPTION OF THE PREFERRED EMBODIMENTS

The image data processing device according to the invention described above may further comprise:

time measuring means for measuring a required time for compression of the specified quantity of image data by the image compressing means; and specified quantity control means for reducing the specified quantity when the required time is longer than a constant value.

The constant value (constant time) can be arbitrarily determined. In this case, the specified quantity may be reduced by a predetermined quantity. Then, the specified quantity is further reduced by the predetermined quantity, if the required time for compressing the image data of the reduced quantity is still longer than the constant value.

The image data compressed by the image compressing means may be temporarily held or stored by a compressed image holding memory which is provided for this purpose.

In any of the cases, the compressed image data may be output, for example, to printing means in the digital copying machine.

In this case, the image data processing device may comprise:

image expanding means for expanding the image data compressed by the image compressing means;

an output image memory for storing the image data expanded by the image expanding means;

drawing means for storing the image data expanded by the image expanding means in the output image memory in order of expansion; and image data output means for reading the image data from the output image memory in order of arrangement of pixels and outputting the same to a downstream unit.

In this case, when the image data for a plurality of pages is to be output, a series of operations of expanding the compressed image data and storing the same in the output image memory are performed in parallel to reading of the image data from the output image memory by the image data output means.

The input image memory, compressed image memory and output image memory may be an input image memory area, a compressed image memory area and an output image memory area each set on a image memory forming one address space, and the image data to be stored is input to the respective areas on the image memory.

The downstream unit may be printing means arranged in a digital copying machine or the like, or raster display means.

Any one of the image data processing devices according to the invention described above can be applied to a digital copying machine.

A preferred example of the digital copying machine will be described below with reference to FIGS. 1 to 13.

Figure 1:
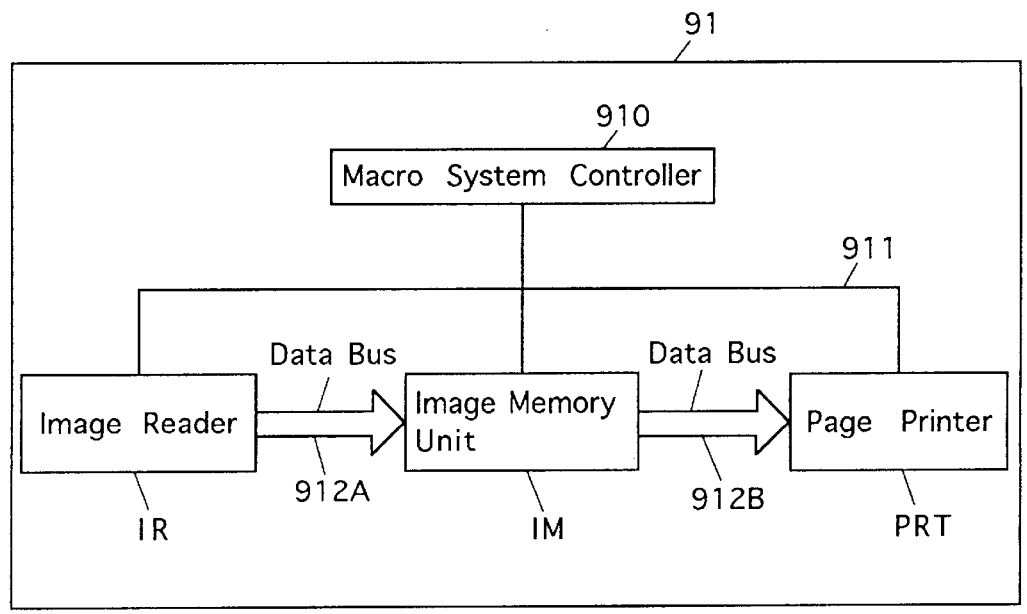
FIG. 1 is a functional block diagram showing an example of a digital copying machine including a data processing device according to the invention.

FIG. 1 is a functional block diagram showing a digital copying machine 91 according to the invention.

The digital copying machine 91 includes an image reader IR provided with a line-sequential original scanning system, an image memory unit IM as an image data processing device of the invention, a page printer PRT of a laser beam exposure type, and an MSC (Macro System Controller) 910 for whole control. Image reader IR includes an automatic document feeder (ADF) and therefore can continuously read a plurality of original documents. The image memory unit IM stores image data in a compressed format. The image data represents pixels and is serially supplied from the image reader IR. The image memory unit IM sends the compressed data for printing to the page printer PRT after expanding the same. The page printer PRT forms a copied image on a sheet by a well-known electrophotographic process. The data is transferred from the image reader IR to the image memory unit IM through a data bus 912A, and is transferred from the image memory unit IM to the page printer PRT through a data bus 912B. The MSC 910 sends and receives commands and statuses to and from the image reader IR, the memory unit IM and the page printer PRT through a control bus 911.

The digital copying machine of this embodiment has an electronic sort function. Thus, the image memory unit IM can store the compressed data for multiple pages.

Figure 2:
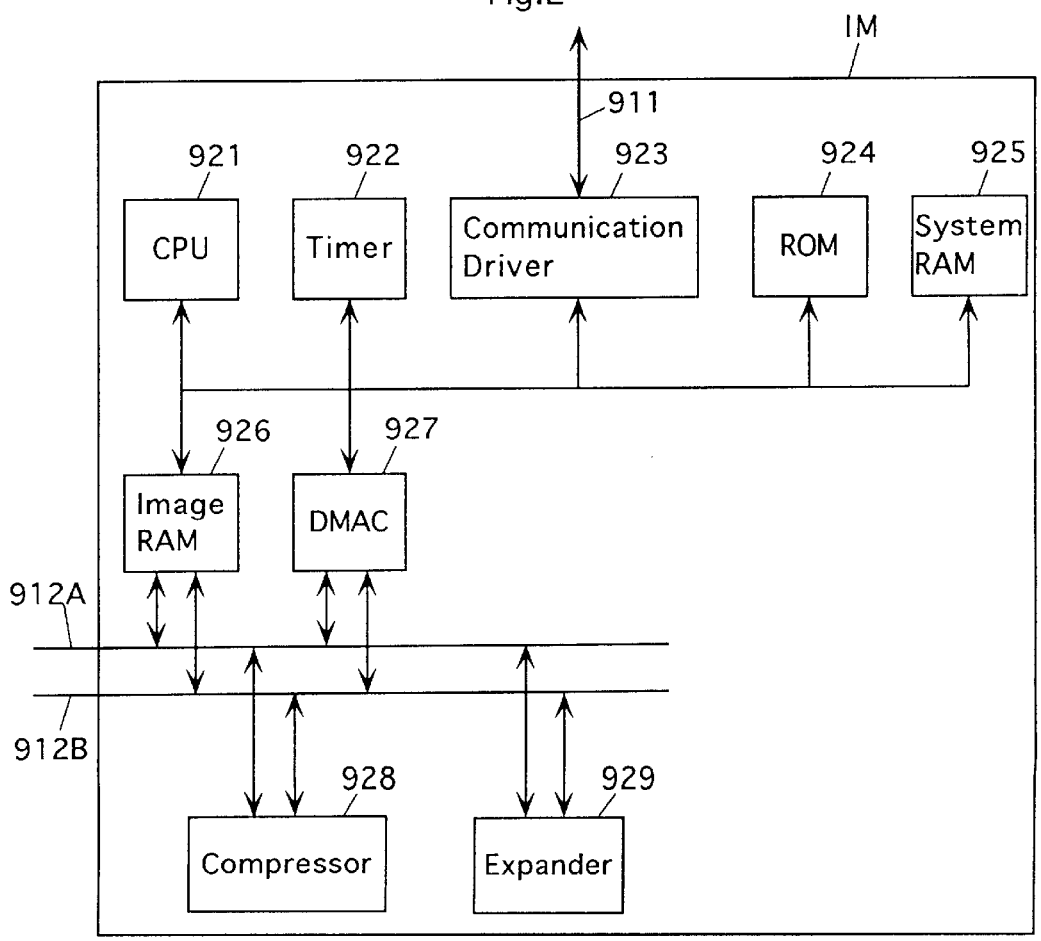
FIG. 2 is a block diagram showing an image memory unit.

FIG. 2 is a block diagram of the image memory unit IM.

The image memory unit IM includes a CPU (central processing unit) 921 executing a control program, a timer 922 measuring a compression time and others, a communication driver 923, an ROM 924 storing the control program, a system RAM 925 forming a work area for program execution, an image RAM 926 temporarily storing image data, a controller (DMAC) 927 achieving multi-channel DMA (direct memory access) transfer of the image data, a compressor 928, an expander 929 and others. The system RAM 925 is also used for storing information indicative of the state of the image RAM 926.

Figure 3A:
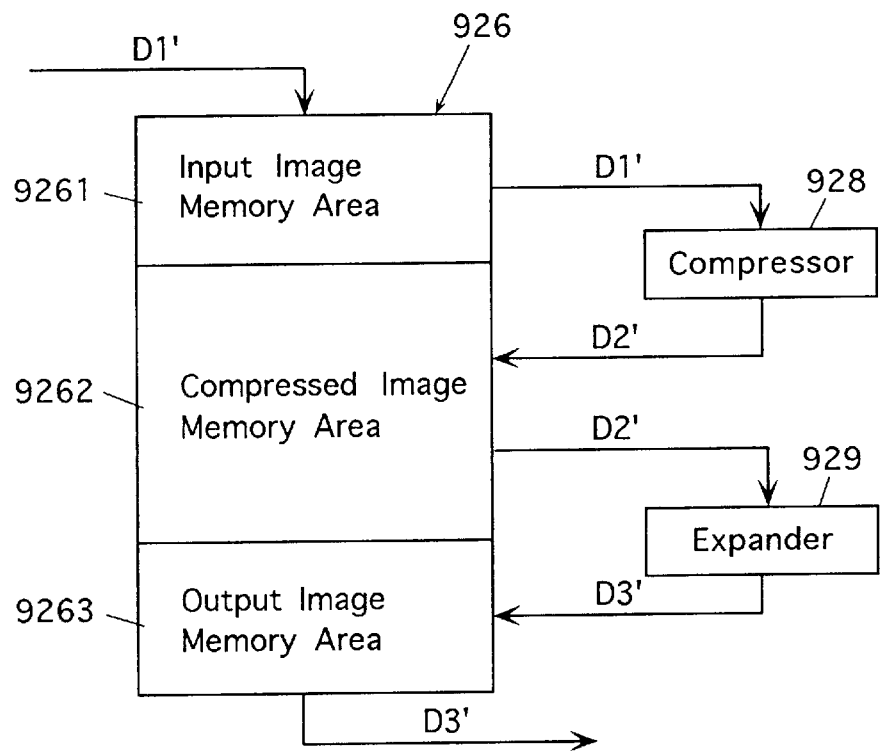
FIG. 3(A) shows a structure of an image RAM.
Figure 3B:
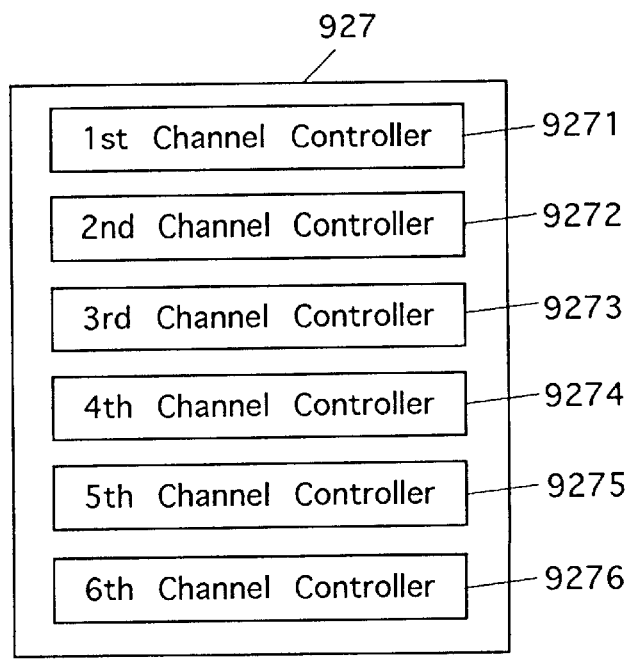
FIG. 3(B) shows a structure of a DMAC.

FIGS. 3(A) and 3(B) show the structures of the image RAM 926 and DMAC 927, respectively.

As shown in FIG. 3(A), an address space of the image RAM 926 is divided into an input image memory area 9261, a compressed image memory area 9262, and an output image memory area 9263. The input image memory area 9261 is divided into a plurality of blocks, as will be described later. Sizes (data capacities) of the blocks are changed depending on the progress of compression.

As shown in FIG. 3(B), the DMAC 927 has first to sixth channel controllers 9271–9276. Image data D1' supplied from the image reader IR is temporarily stored in the input image memory area 9261 by the first channel controller 9271, and then is transferred to the compressor 928 by the second channel controller 9272. This transfer is performed a predetermined number of lines at a time (i.e., a block of the input image memory area 9261 at a time). Thus, the compression is performed block by block. The image data D1' in the compressed state (compressed data D2') is stored in the compressed image memory area 9262 by the third channel controller 9273. Thereafter, the compressed data D2' is transferred block by block to the expander 929 by the fourth channel controller 9274. The expansion is also performed block by block. Expanded image data D3' is written into the output image memory area 9263 by the fifth channel controller 9275. Thus, a copied image is virtually drawn in the output image memory area 9263. The sixth channel controller 9276 performs control for reading the image data D3' from the output image memory area 9263 and sending the image data D3' to the page printer PRT in synchronization with the operation of the page printer PRT. In the page printer PRT, the image data D3' is used as modulated data of laser beams.

The CPU 921 specifies a transfer start address and a transfer size for the DMAC 927. The CPU 921 reads a count of a transfer counter of the DMAC 927 for determining a progress of transfer.

For copying multiple documents (e.g., when electronic sort is performed), the compressed image memory area 9262 stores the compressed data D2' for a plurality of pages in some cases. For managing the compressed data D2', the system RAM 925 is provided with a compressed data management table T1.

Figure 4:
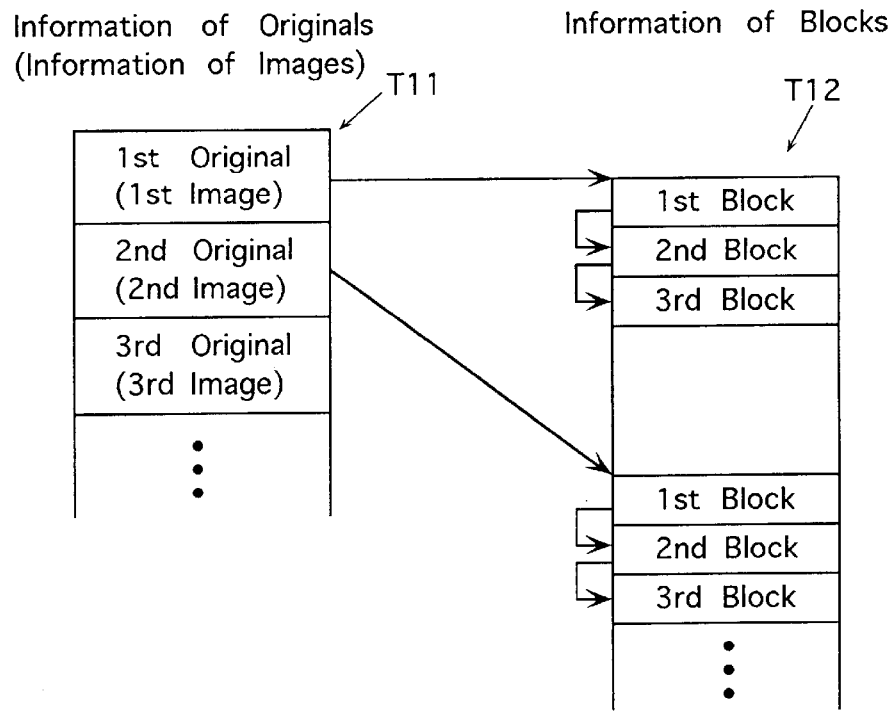
FIG. 4 schematically shows a data configuration of a compressed data management table.

FIG. 4 schematically shows a data configuration of the compressed data management table T1.

The compressed data management table T1 is formed of information T11 for originals and information T12 for blocks. The information T11 of original represents sizes of the original document, a position of the last-compressed block during compression and others. The information T12 of the block unit represents the number of lines indicating the size of block, a pointer indicating a storage position of the compressed data in each block, a data length of the compressed data in each block and others.

[Operation of Image Memory Unit IM]

FIG. 5 is a schematic diagram showing partitions in the input image memory area 9261.

In this embodiment, the input image memory area 9261 is partitioned into a plurality of blocks mb, and the compression is performed block by block in order to advance a timing of completion of compression for one original (image data D1 for one page). The block mb has an address space for a plurality of lines, and basically the address space has a constant size. However, the CPU 921 changes the size of block mb in accordance with the situation or progress of compression.

By checking the transfer counter in the DMAC 927, it is possible to determine an amount of the image data D1' stored in the input image memory area 9261, i.e., the number of lines of image data already input. In the example shown in FIG. 5, the image data D1' has been stored fully in an area from the first block to the middle of the third block, as indicated by hatching in FIG. 5. Upon every completion of storage in each block mb, compression of the image data D1' in the block mb starts. Thus, in parallel with storage of the image data D1' in the input image memory area 9261, the DMAC 927 reads the image data D1' from the block mb which has already stored the data, and transfers the same to the compressor 928. In the stage shown in FIG. 5, compression of the image data D1' in the two blocks mb can be performed. According to this parallel processing, the compression starts prior to completion of the data input for one page, so that the compression time for one page can be shortened.

By dividing the image data D1' for one page correspondingly to the blocks mb for compressing the same, the data can be successively expanded block by block, so that the expansion time can be shortened.

FIG. 6 shows an example of the state of the output image memory area 9263. A hatched portion in the figure shows an area in which image data D3' for the last page still remains. In the other portion or area, reading of the image data D3' and outputting the same to the page printer PRT are already completed. In the example shown in FIG. 6, reading for three blocks is completed. In this stage, therefore, the compressed data D2' corresponding to the three blocks for the next page can be expanded and stored in the output image memory area 9263. Thus, output of the image data D3' of the last page and drawing of the next page can be performed in parallel.

Figure 7:
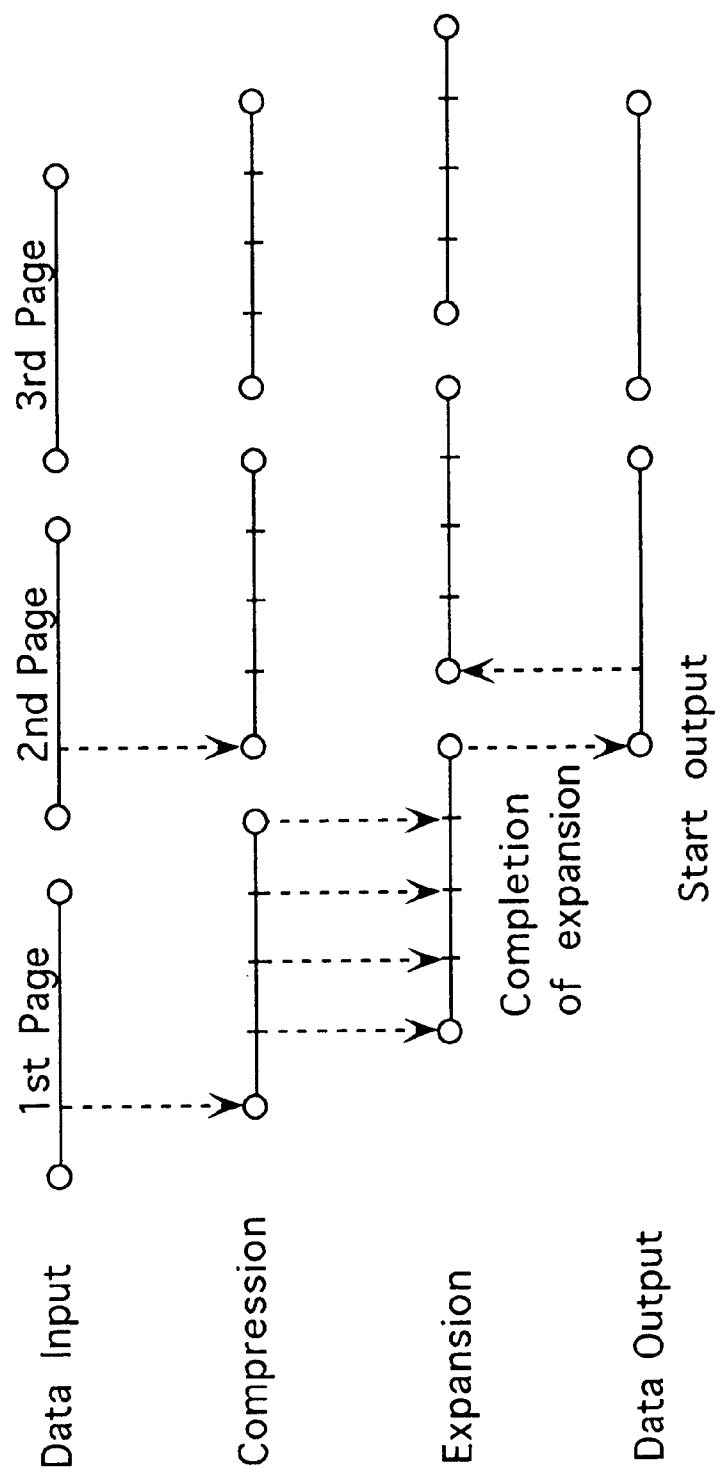
FIG. 7 shows a relationship in timing of execution between operations in an image memory unit.

FIG. 7 shows a relationship in timings of execution between various kinds of operations in the image memory unit IM. In FIG. 7, it is assumed that equal times are required for storage (data input) of the image data D1' into the input image memory area, compression and expansion as well as reading (data output) of image data D3' from the output image memory area 9263. Also, it is assumed that the image information for one page is divided into four blocks for compression and expansion.

The compression starts during input of the data for the 1st page (i.e., at the point of time that storage into the first block mb is completed). Expansion starts during compression for the first page, and output of the data for the first page starts at the point of time that expansion for the first page is completed. Likewise, for the second page, compression starts at the point of time that storage into the first block is completed. At the point of time that compression of the first block mb for the second page is completed, expansion of the first block mb for the second page can be started, because the data output of one block of the first page was already completed.

Data output cannot start at the stage where expansion for one page is not completed. However, for the second and subsequent pages, expansion for several blocks is already completed when data output for the last page is completed, so that data output can start at a significantly early timing compared with the case where expansion starts after completion of the data output for the last page. In the case where the four processings (i.e., data input, compression, expansion and data output) require different times, the entire processing time is likewise reduced owing to the parallel processing.

Figure 8:
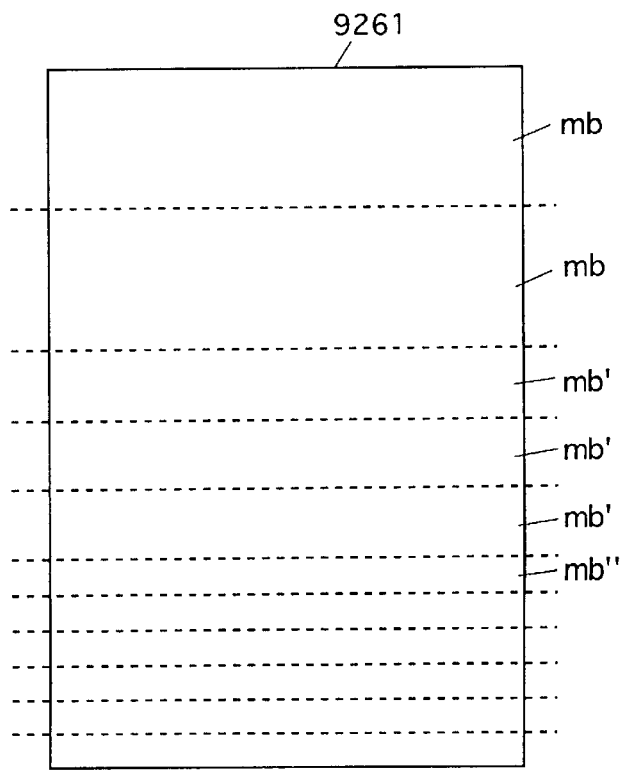
FIG. 8 is a schematic diagram showing change in size of a block.

FIG. 8 is a schematic diagram showing change in size of the block mb.

As the size of block mb increases, a longer time is required for compression. If a time required for compression for one block is longer than that required for data input for one block, start of the compression delays, resulting in reduction in efficiency of the parallel processing. This can be effectively dealt with reduction in size of block mb. In the image memory unit IM, the timer 922 measures a time required for compression. When the measured value is longer than a reference value, the size of block mb is reduced. If the block mb' thus reduced requires a time for compression which is longer than the reference value, a block mb" of a further reduced size is set as a unit for compression. If the reduced size is initially set, the quantity of data of the compressed data management table T1 significantly increase, so that the system RAM 925 is significantly occupied by the compressed data management table T1.

Figure 9:
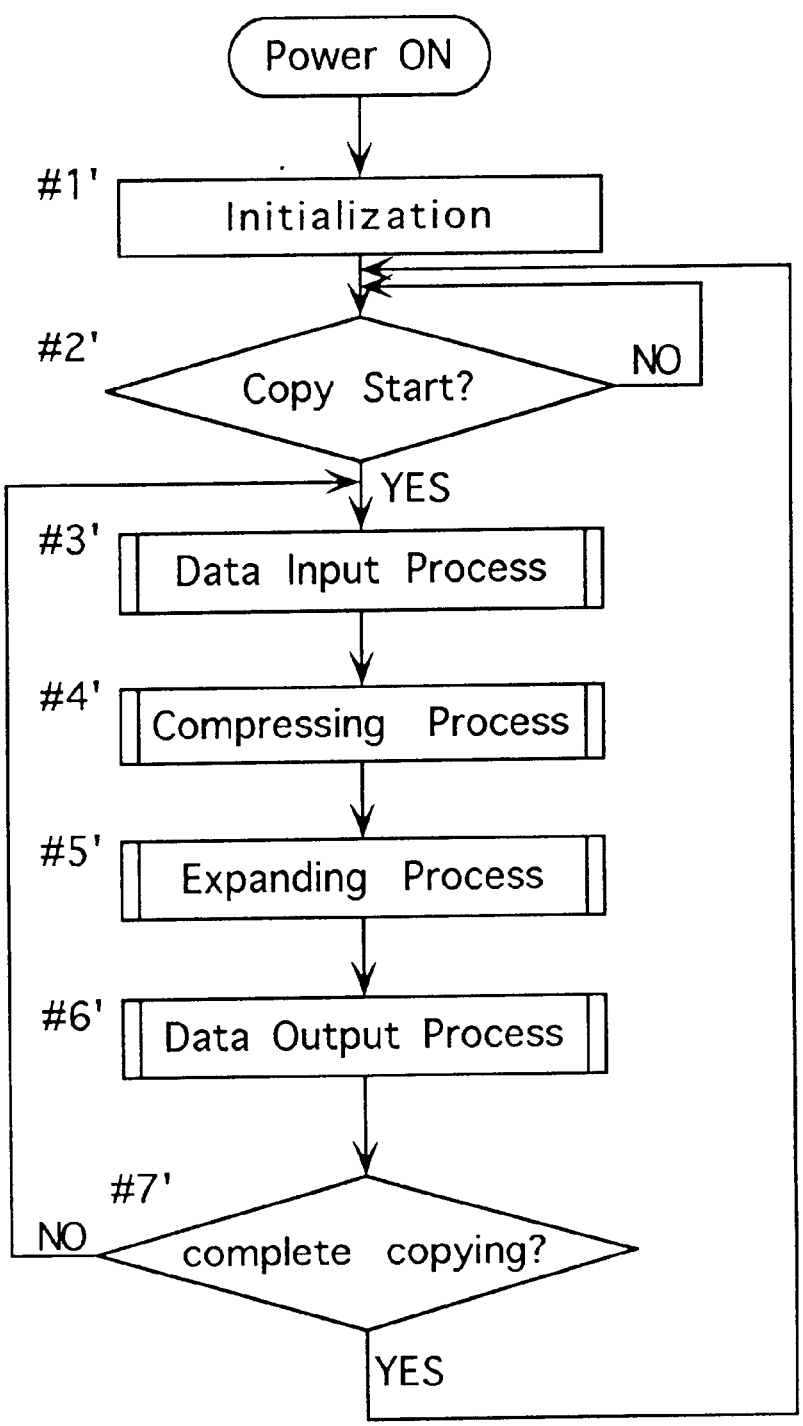
FIG. 9 is a flowchart showing a control operation of a CPU of an image memory unit.

FIG. 9 is a flowchart showing a control operation of the CPU 921 in the image memory unit IM.

Upon power-on, the CPU 921 initializes internal registers storing statuses and parameters, and waits for an instruction for copy start (#1', #2'). In response to the copy start, the data input (#3'), compression (#4'), expansion (#5') and data output (#6') are successively performed, and are repeated until the end of copying (#7'). When the copying ends, a next instruction for copy start is waited.

Figure 10:
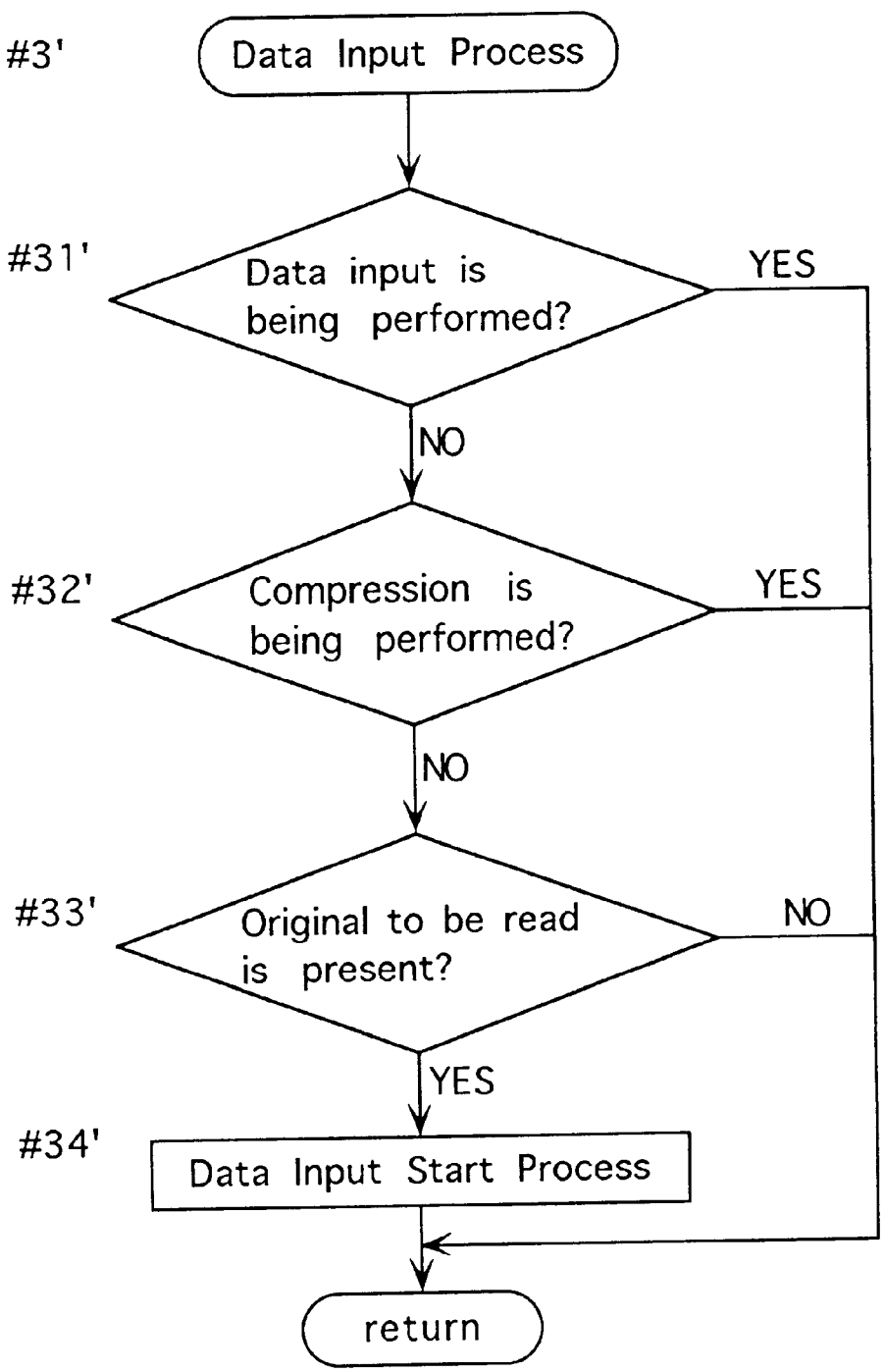
FIG. 10 is a flowchart showing data input processing.

FIG. 10 is a flowchart showing data input processing.

During data input, the operation returns to the main routine without performing substantial processing (#31'). When an original to be read is present while neither data input nor compression is being performed, the data input starts (#32'–34'). Thus, the DMAC 927 is activated, and a request for reading the original is sent to the image reader IR.

Figure 11:
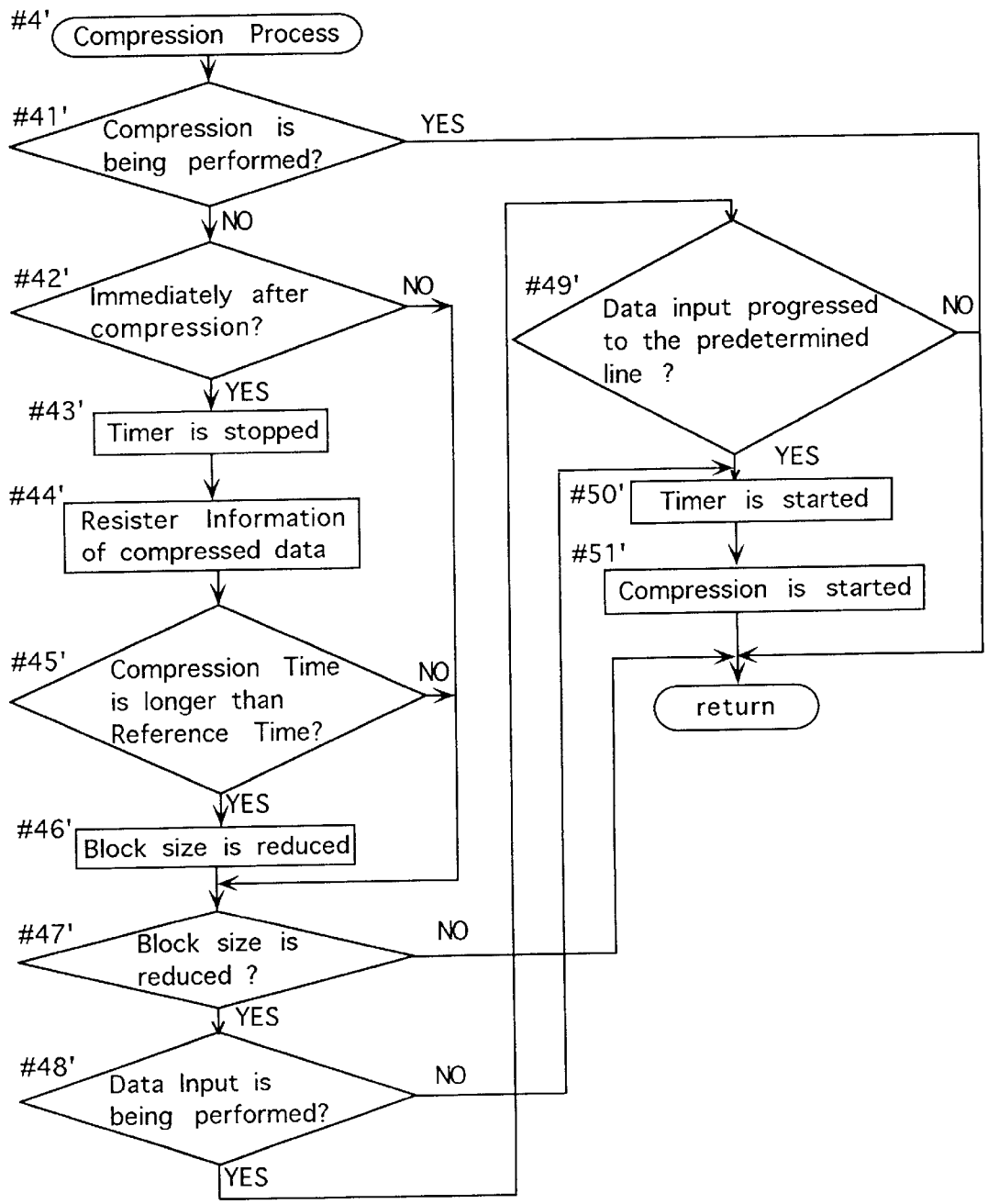
FIG. 11 is a flowchart showing data compression processing.

FIG. 11 is a flowchart showing compressing processing.

In this routine, it is initially confirmed that the compression is not being performed (#41'). If this stage is immediately after the compression, the timer 922 for measuring the compression time stops (#42', #43'), and information of the compressed data D2' is registered in the compressed data management table T1 (#44'). If the compression time is longer than the reference time, the size of block mb is reduced (#45', #46').

If there is the image data D1' to be compressed, it is confirmed that data input is not being performed (#47', #48'). When confirmed, timer 922 starts measuring of the compression time (#50'), and then the compression starts (#51'). More specifically, the compressor 928 is activated, and an instruction for data transfer from the image RAM 926 to the compressor 928 is sent to the DMAC 927. When it is found that the data input is being performed, the compression starts if data input to one or more blocks mb is completed (#49'–#51'). Progression of the data input is represented by the transfer counter of the DMAC 927.

Figure 12:
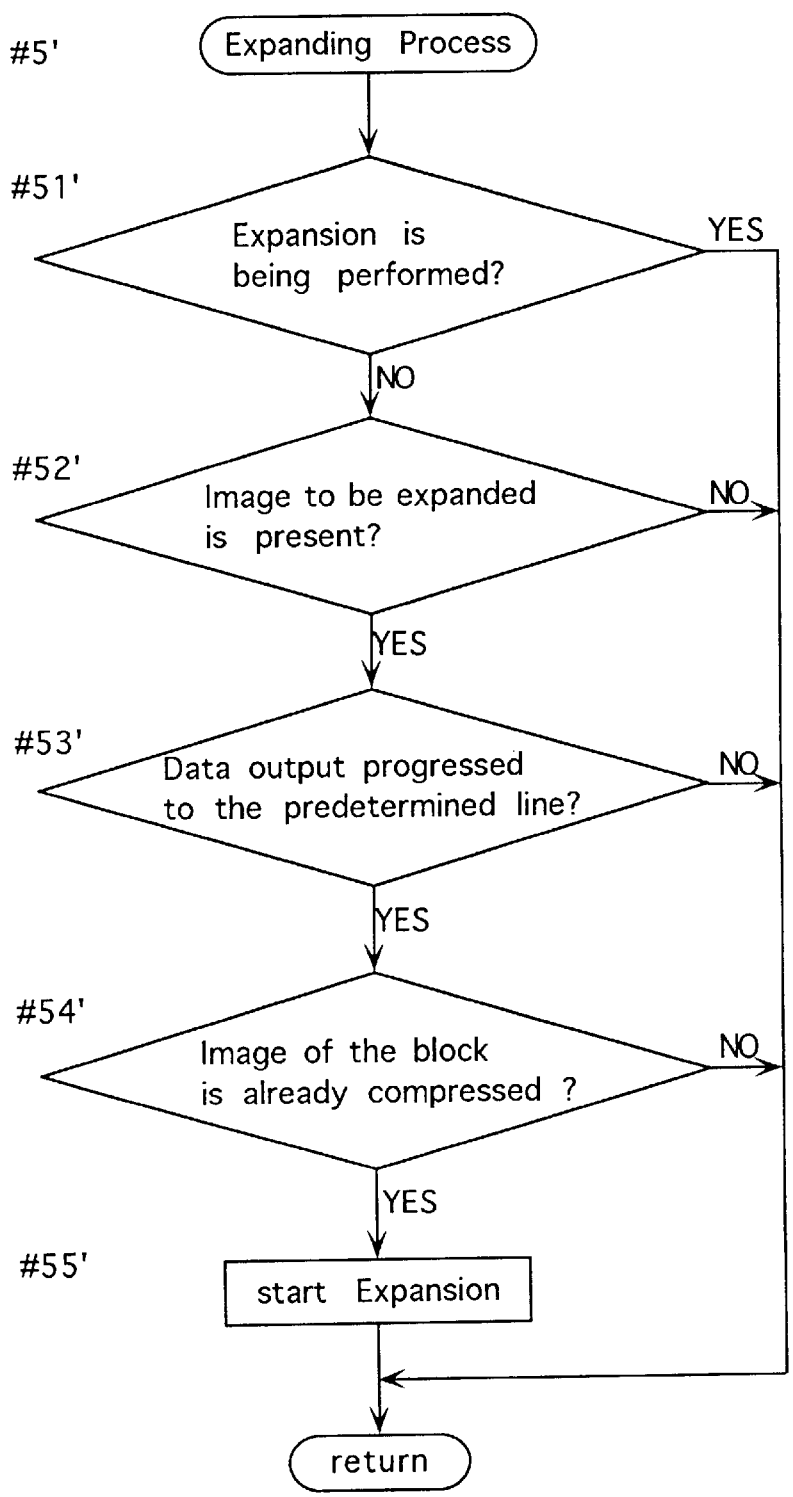
FIG. 12 is a flowchart showing expansion processing.

FIG. 12 is a flowchart showing the expanding processing.

It is confirmed that the expansion is not being performed (#51'), and it is confirmed with reference to the compressed data management table T1 that an image to be expanded is present (#52'). If the image to be expanded is present, it is checked, with reference to the output line counter of the DMAC 927, whether or not the data output has progressed to a predetermined line allowing expansion block by block (#53'). If the data output has progressed to the predetermined line, the expansion starts in response to completion of the compression for one block (#53'–#55'). More specifically, the expander 929 is activated, and an instruction for data transfer from the image RAM 926 to the expander 929 is sent to the DMAC 927.

Figure 13:
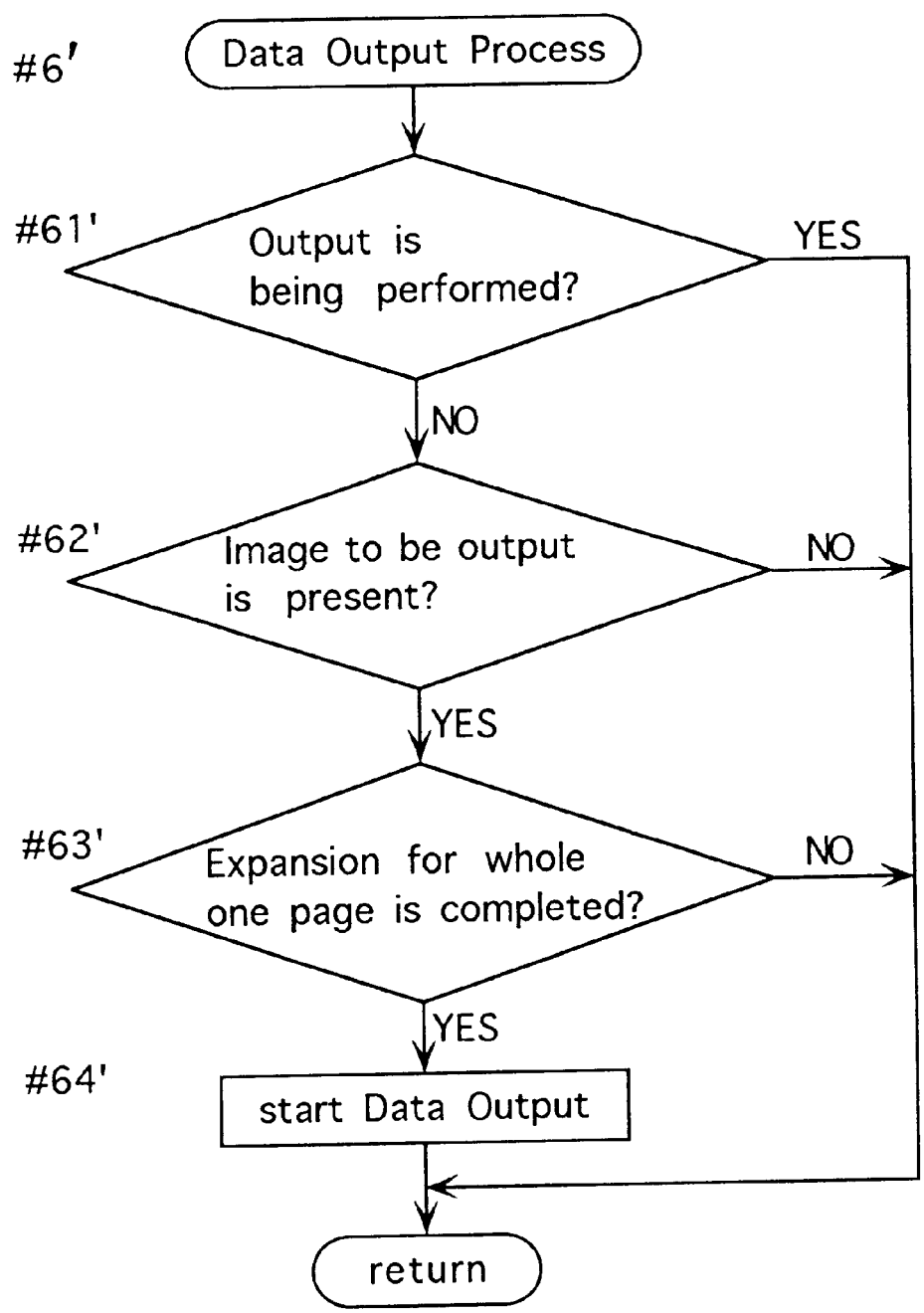
FIG. 13 is a flowchart showing data output processing.

FIG. 13 is a flowchart showing the data output.

In the case where the output is not being performed, the image data D3' to be output is present and expansion for one page is completed, an instruction for start of data output is sent to the DMAC 927, and a request for printing is sent to the page printer PRT (#61'–#64').

In the above embodiment, each of the data capacities of the input image memory area 9261 and the output image memory area 9262 may be smaller than that corresponding to one page. If the compression requires a time longer than the reference value, the size of block mb is reduced at two or more stages (the number of corresponding lines is reduced) according to the above description. However, if the system RAM 925 has a smaller capacity, it may be reduced only one time. If the compression time is short, the size of block mb may be increased.

The digital copying machine of the above second type according to the invention will be described below more in detail.

In the digital copying machine of this type, for example, the means for setting the input image memory area in the image memory sets one or more bands as the input image memory area, and the means for changing the input image memory area in accordance with the original size detected by the original size detecting means is adapted to change the input image memory area on the basis of the band unit.

The digital copying machine may be provided with output image memory area setting means for setting in the image memory an output image memory area for holding the image data to be sent to the printing means, and output image transferring means for transferring the image data from the image holding memory area to the output image memory area.

In this case, the output image memory area setting means sets the area corresponding to the maximum original size on the image memory, before the original size detecting means detects the original size, and changes the area correspondingly to the detected original size, after the original size detecting means detects the original size.

In this case, the output image memory area setting means may set one or more bands as the output image memory area, and, after the original size detecting means detects the original size, the output image memory area may be changed on the unit-by-unit basis.

In any of the above cases, there may be provided with image data compressing means for compressing the image data and image data expanding means for expanding the compressed image data.

In this structure, the compressing means compresses the image data before the input image transferring means transfers the image data from the input image memory area to the image holding memory area, and the expanding means expands the compressed image data before the output image transferring means transfers the image data from the image holding memory area to the output image memory area.

A preferred example of the digital copying machine of the second type will be described below with reference to FIGS. 14 to 32.

Figure 14:
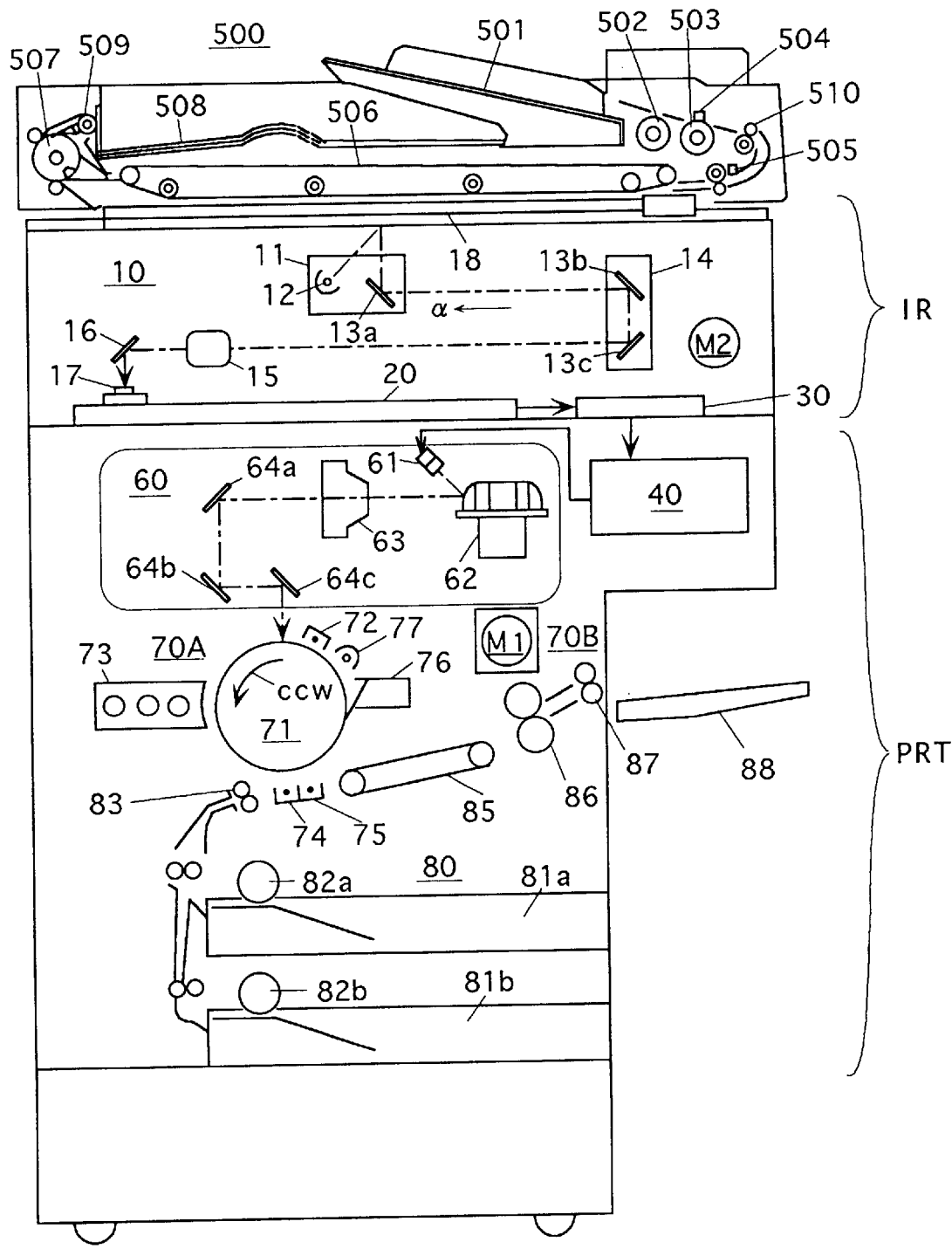
FIG. 14 shows a schematic structure of another example of a digital copying machine according to the invention.

FIG. 14 schematically shows a structure of the digital copying machine of the second type.

This digital copying machine includes a image reader IR and a page printer PRT.

A main body of the image reader IR includes a scanning system 10, which decomposes the original on a document table glass 18 into pixels for reading the same, an image signal processing unit 20, which quantizes a photoelectrically converted signal issued from the scanning system 10 and performs signal processing depending on various image forming modes, and a memory unit 30, which stores the image data corresponding to the original. On the main body, there is arranged an automatic duplex document feeder (ADFR) 500, which is an additional unit serving also as a document cover, and arranged pivotably around its rear end.

The scanning system 10 is an image reading mechanism of a line scanning type, and includes a scanner 11 which has a lamp 12 for illuminating an original and a mirror 13a, mirrors 13b and 13c carried on a frame 14, a condensing lens 15, an image sensor 17 formed of a CCD array, a reflection mirror 16 for leading light beams passed through the lens 15 to the sensor 17, and a scan motor M2 for driving the scanner 11. By driving the scanner 11 in a direction of an arrow α in FIG. 14, the original image can be scanned. The image signal processing unit 20 and the memory unit 30 will be described below.

The ADFR 500 transfers an original document laid on a document stacker 501 onto the document table glass 18 by a feed roller 502, a separating roller 503, a separating pad 504, an intermediate roller 510, a registering roller 505 and a transfer belt 506. The ADFR 500 also discharges the document onto a document discharge tray 508 by a sheet discharge roller 509 after reading or scanning.

For example, an operator puts a plurality of documents on the document stacker 501 with their front side up. The documents are pulled out one by one from the lowest position on the document stacker 501, and is precisely located at a reading position on the document table glass 18 with its front surface down. In a single-side document mode, the document is transferred leftward in the figure after the reading, and is discharged with its front side up. In the double-side document mode, the document which was sent leftward after reading the front side is inverted by an inverting roller 507 and is returned to the reading position on the document table glass 18. Thereby, the reading of the rear side is performed, and then is sent leftward and discharged.

The page printer PRT includes a print processing unit 40 which issues an exposure control signal, a print head 60 using a semiconductor laser 61 as a light source, a developing and transferring system 70A formed of a photosensitive drum 71 and its peripheral units, a fixing and discharging system 70B having a fixing roller pair 86 and a discharge roller pair 87, a sheet transferring system 80 and others. Based on the image data transferred from the image reader IR, the copy image is printed by an electrophotographic process. At a lower portion of the page printer PRT, there are arranged two sheet cassettes 81a and 81b, each of which can accommodate hundreds of sheets, sheet feed rollers 82a and 82b for pulling out the sheet from the cassette, an intermediate roller group for sheet feeding, a timing roller pair 83 and others.

The laser beams projected from the semiconductor laser 61 are polarized by a polygonal mirror 62 into a primary scanning direction, and is led to a exposing position on the photosensitive drum 71 through a main lens 63 and by various mirrors 64a, 64b and 64c. The photosensitive drum 71 is driven to rotate in the direction indicated by an arrow CCW in FIG. 14. Prior to the exposure, a charging charger 72 uniformly charges the surface of the photosensitive drum 71. A latent image formed by the exposure is developed into a toner image by a developer 73. Meanwhile, a sheet from the cassette 81a or 81b is fed by the timing roller pair 83 to a transfer position in synchronization with the toner image. The toner image is transferred onto the sheet at the transfer position by a transfer charger 74. The sheet is separated from the photosensitive drum 71 by a separating charger 75, and is sent to the fixing roller pair 86 by a transfer belt 85. The toner image is fixed on the sheet by the fixing roller pair 86. Then, the sheet is discharged by the discharging roller pair 87 onto a discharging tray 88. After the transfer, the toner remaining on the photosensitive drum 71 is removed and cleaned off by a cleaner 76, and residual electric charges on the drum 71 are erased by an eraser 77.

Figure 15:
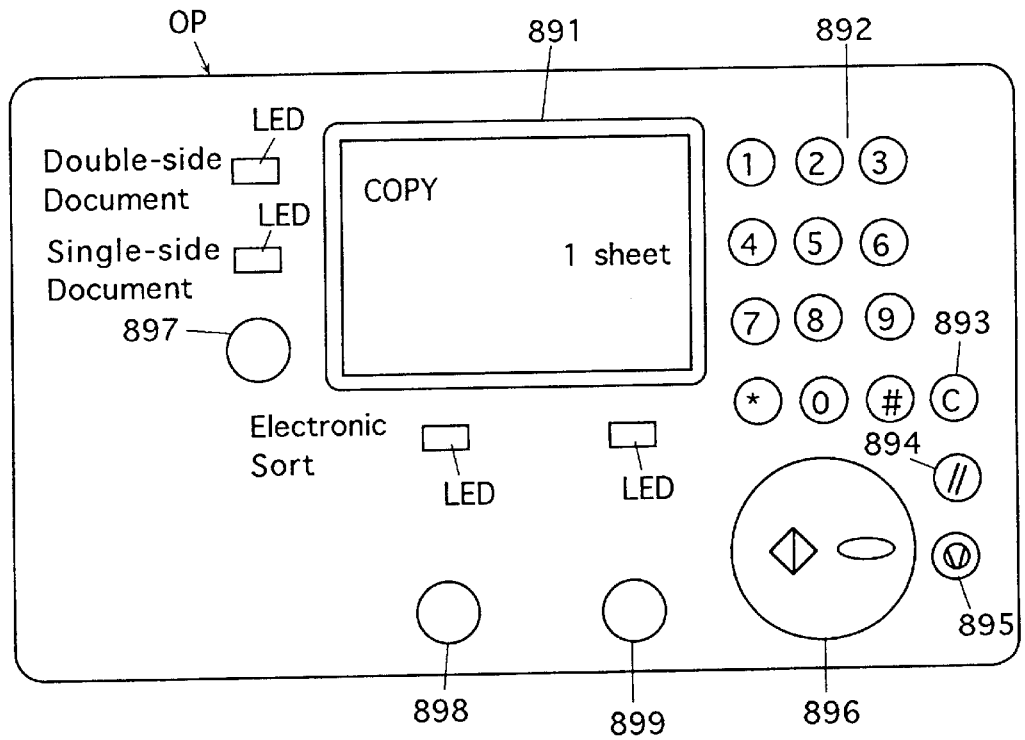
FIG. 15 is a plan showing a operation panel of the copying machine in FIG. 14.

FIG. 15 is a plan of a operation panel of the copying machine.

The operation panel OP includes a liquid crystal display with touch panel 891 for displaying statuses and designating various modes, a numeric keypad 892 for entering numerical conditions for copying (copy number, scaling and others), a clear key 893 for resetting numerical conditions to standard conditions, a panel reset key 894 for initializing the copy mode, a stop key 895 for instructing stop of copying, a start key 896 for instructing start of copying, a document type designating key 897 for selecting single-side or double-side documents, a finish mode key 898 for designating whether electronic sort is required or not, and an input mode key 899 for designating the number of documents. The electronic sort is performed in the following case. M (M≧2) sets of copies are to be produced from a set of documents, i.e., multi-copy is to be performed, and the original documents are two or more (e.g., 3) in number. The operation of producing one copied document from each page of the document set is repeated M times for producing the copied document sets which are M in number. In a non-electronic-sort mode, M copied documents are continuously produced from each original document in the order of reading.

Figure 17:
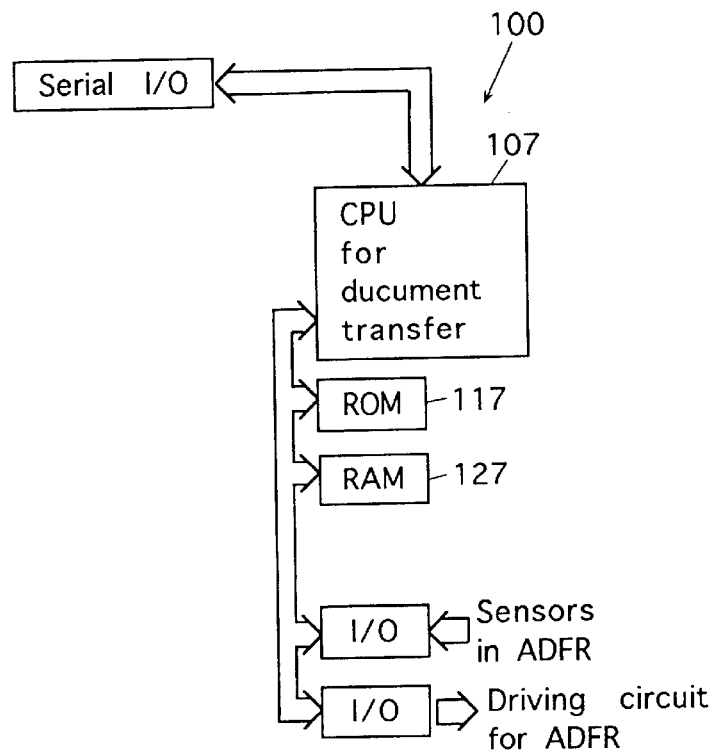
FIG. 17 is a block diagram showing the other portion of the controller of the copying machine shown in FIG. 14.
Figure 16:
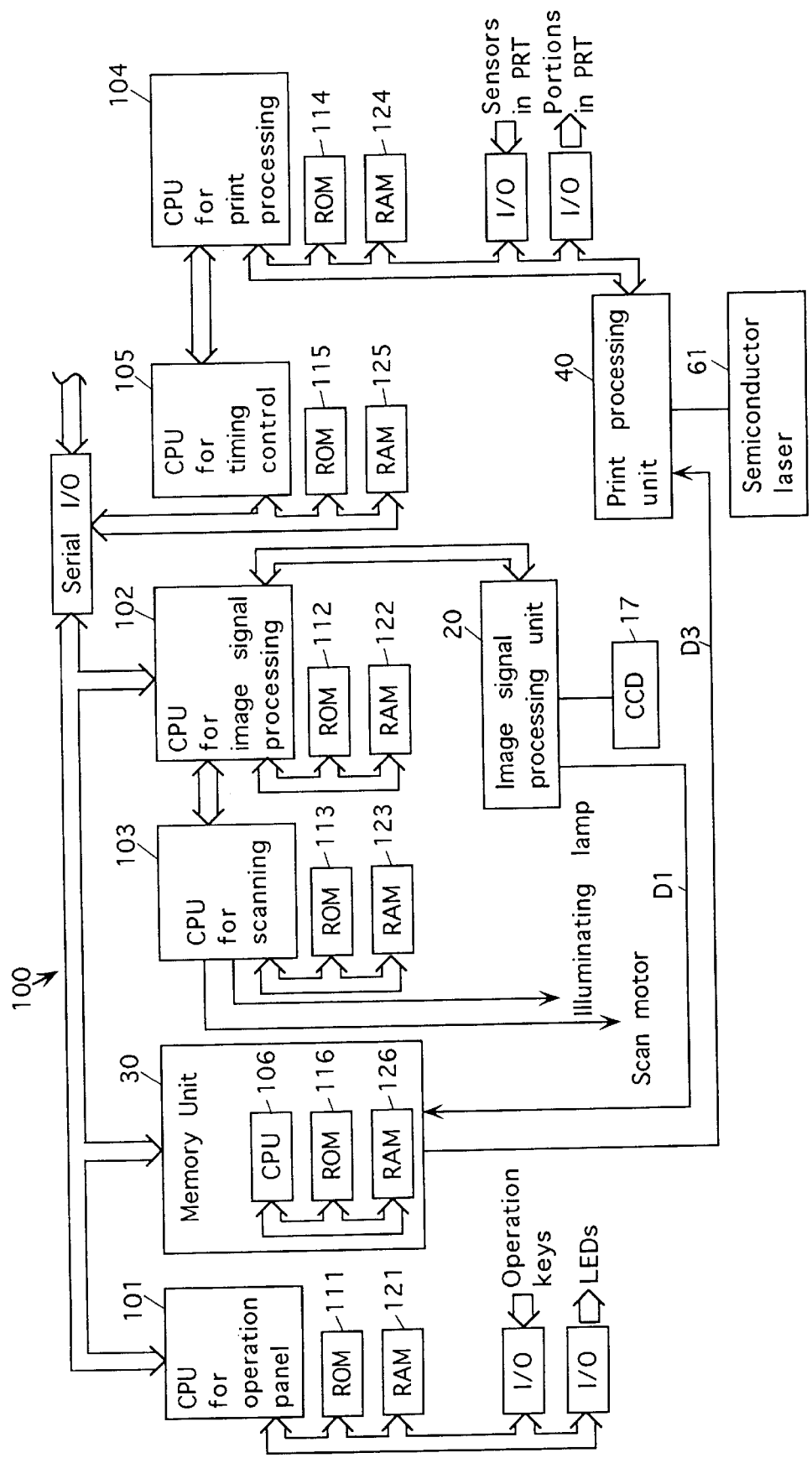
FIG. 16 is a block diagram showing a portion of a structure of a controller in the copying machine shown in FIG. 14.

FIGS. 16 and 17 are block diagrams showing a structure of a controller 100 of the copying machine described above.

The controller 100 includes, as major components, seven central processing units (CPUs) 101–107, for which ROMs 111–117 storing programs and RAMs 121–127 providing work areas for program execution are provided, respectively. The CPU 106 is arranged in the memory unit 30.

The CPU 101 controls signal input by various keys and display on the operation panel OP. The CPU 102 controls various portions in the image signal processing unit 20. The CPU 103 controls driving of the scanning system 10. The CPU 104 controls an entire operation of the page printer PRT including the print processing unit 40.

The CPU 105 operates for the general timing control of the controller 100 and setting of the operation modes. For this purpose, the CPU 105 performs serial communication with the other CPUs to send and receive commands and reports necessary for the control.

The CPU 106 controls storing and reading of the image information. The CPU 107 controls document transfer by the ADFR 500.

Figure 18:
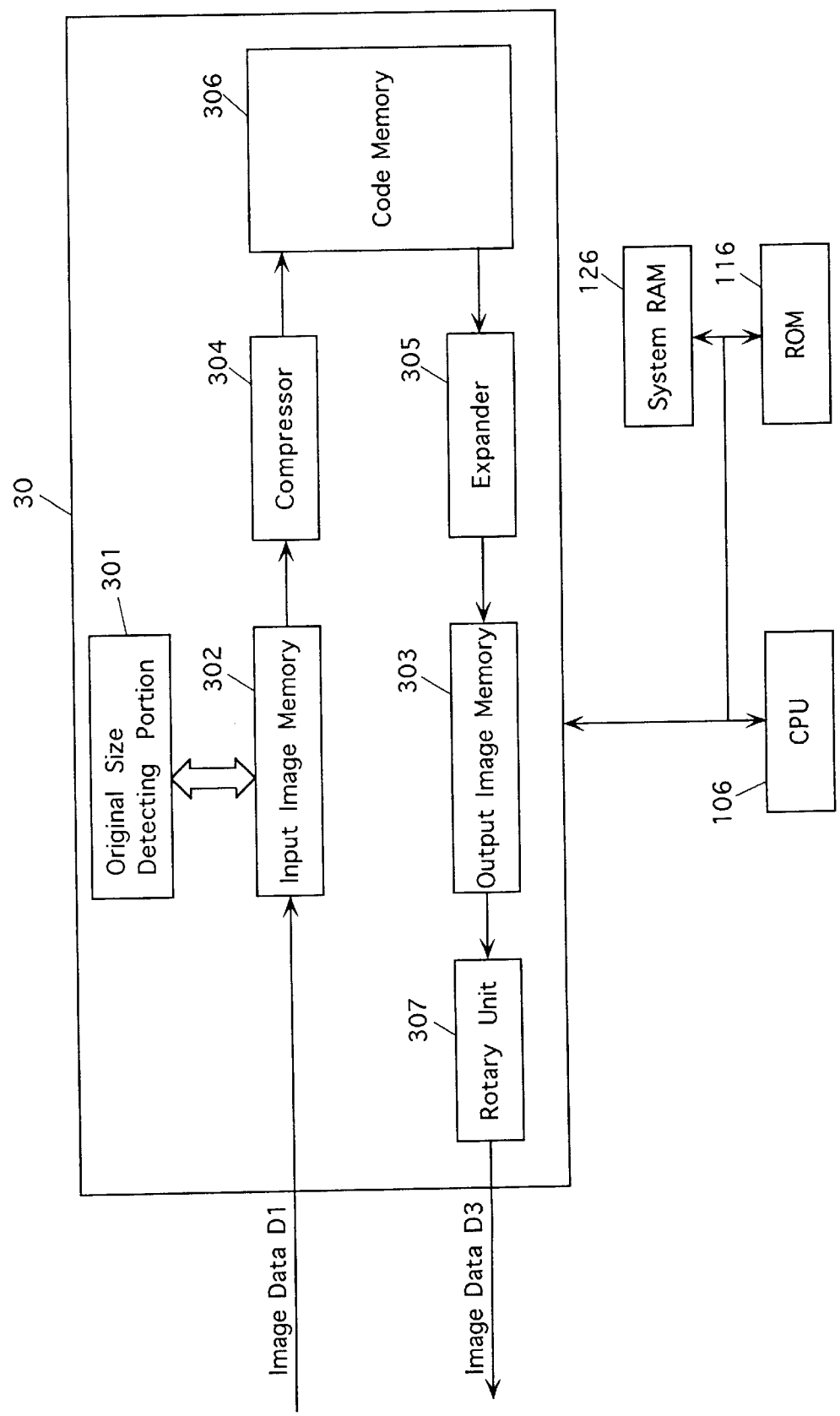
FIG. 18 is a block diagram showing a structure of a memory unit in the controller shown in FIG. 16.

FIG. 18 is a block diagram showing a structure of the memory unit 30.

The memory unit 30 includes an input image memory 302 for storing read image data D1 sent from the image signal processing unit 20, a compressor 304 for compressing the image data, and an expander 305 for expanding the image data, a code memory 306 for holding the compressed image data, an output image memory 303 for holding the image data to be sent to the print head 60, an original size detecting portion 301 for detecting an effective original size area from the image data sent from the image reader IR, a rotary unit 307 performing rotation or turn processing for image data output, the ROM 116 holding a program for operating the memory unit 30, the (system) RAM 126 holding the state for program operation and the CPU 106.

The image data D1 read by scanning the original is supplied to the input image memory 302 through a data bus. An effective area is detected by the original size detecting portion 301 from the image data D1 in the input image memory 302.

Figure 19:
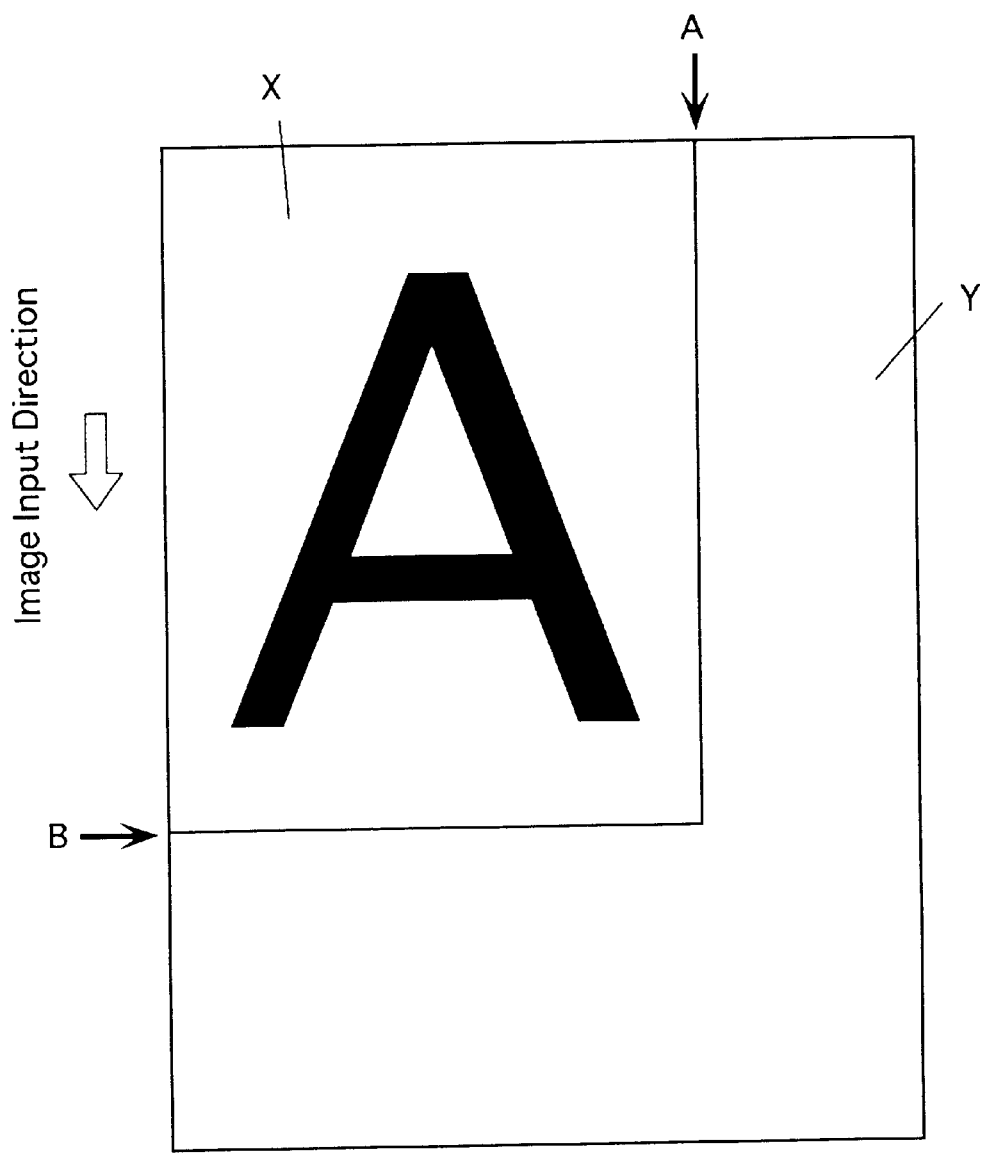
FIG. 19 exemplifies a general state of an image supplied to an input image memory of the memory unit.
Figure 20:
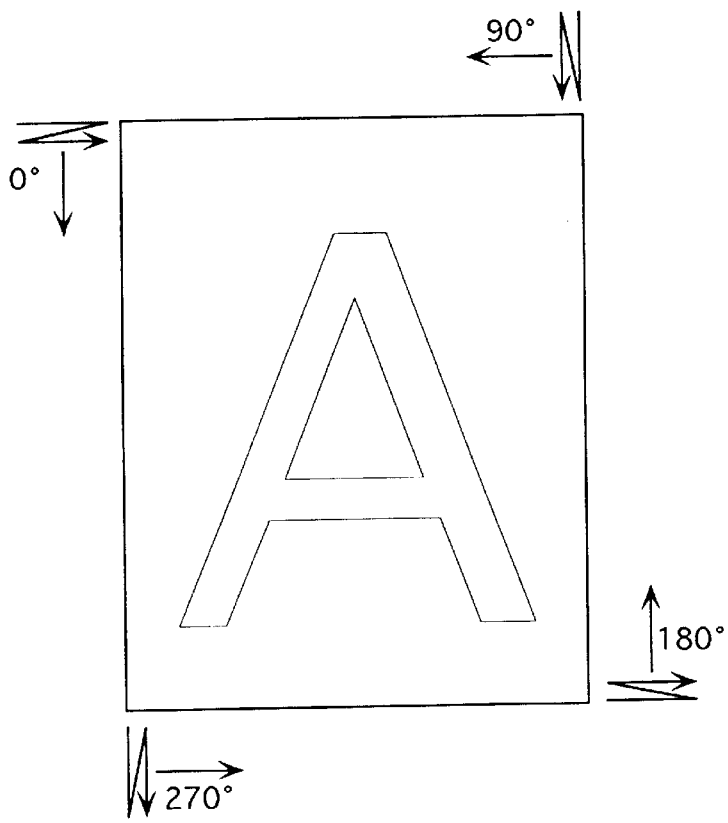
FIG. 20 shows image rotation by a rotation unit in the memory unit.

As shown in FIG. 19, the image supplied to the input image memory 302 is partitioned into a region X which has been read as the original image and a region Y at which the original was not located. The region Y in the figure is processed as will be described later.

The original size detecting portion 301 scans the image data D1 on the input image memory 302 to determine these regions. For actually determining the effective area, information about lateral and longitudinal lengths of the original is required. In the illustrated embodiment, therefore, processing is performed to detect longitudinal and lateral boundary lines A and B between the regions X and Y.

Algorithm and others for detecting the original sizes used in this embodiment are the same as those in the known image processing technology, and therefore, will not be described specifically.

The code memory 306 can store a plurality of images, and management of the images are performed with the management table (see FIG. 4) prepared in the (system) RAM 126. The table contains a portion for storing information (T11) representing the image as a unit and a portion for storing information (T12) representing the block as a unit. The image for one page, which is read as will be described later, is not compressed as it is, but is divided into some blocks for compression, and the compressed image data in the divided form is stored in the code memory 306.

The image unit information (T11) portion stores information for individual pages, and more specifically information representing whether the original sizes are fixed or not as well as information representing the sizes, the block in which compression is completed and the extents to which compression and expansion are completed.

The block unit information (T12) portion stores information relating to individual blocks, and specifically, it stores the number of lines of the block, and a pointer indicative of the position on the code memory 306 at which the compressed image is arranged as well as the compressed image sizes and others.

This table is produced when the compression for individual pages starts, and is erased when a necessary number of pages are printed out.

An operation of the memory unit 30 during the copying operation will be described below.

The original is scanned by the image reader IR, and the read image is supplied as the image data D1 to the input image memory 302 through the data bus. The image supplied to the input image memory 302 is compressed at the compressor 304, and is transferred to the code memory 306. The compressed image in the code memory 306 is restored to the initial image by the expander 305, and then is sent to the output image memory 303. When the image expansion is completed, the image is synchronously transferred as exposure control data D3 from the output image memory 303 to the print processing unit 40 through the bus. In this operation, the rotary unit 307 may be activated to change the direction of reading from the output image memory 303, whereby image rotation is allowed (see FIG. 20).

If an image consisting of the regions X and Y is read into the input image memory 302 as shown in FIG. 19, the region Y representing only noises wastefully occupies the memory. This causes the following problems.

(1) Since an area for the region Y is also compressed, the image data compressed by the compressor 304 increases in quantity, which increases the compression time. Likewise, expansion by the expander 305 requires a longer time for expansion.

(2) Since a wasteful area is present on the memory, the memory cannot be used for another purpose.

It can be seen from FIG. 19 that the boundary A can be detected at an early stage during reading in view of the image input direction. Therefore, this copying machine is devised such that the lateral width of the input image memory 302 is reduced into the fixed or determined size at a point of time that the boundary A is fixed or determined during storage of the image data into the memory 302.

Figure 21:
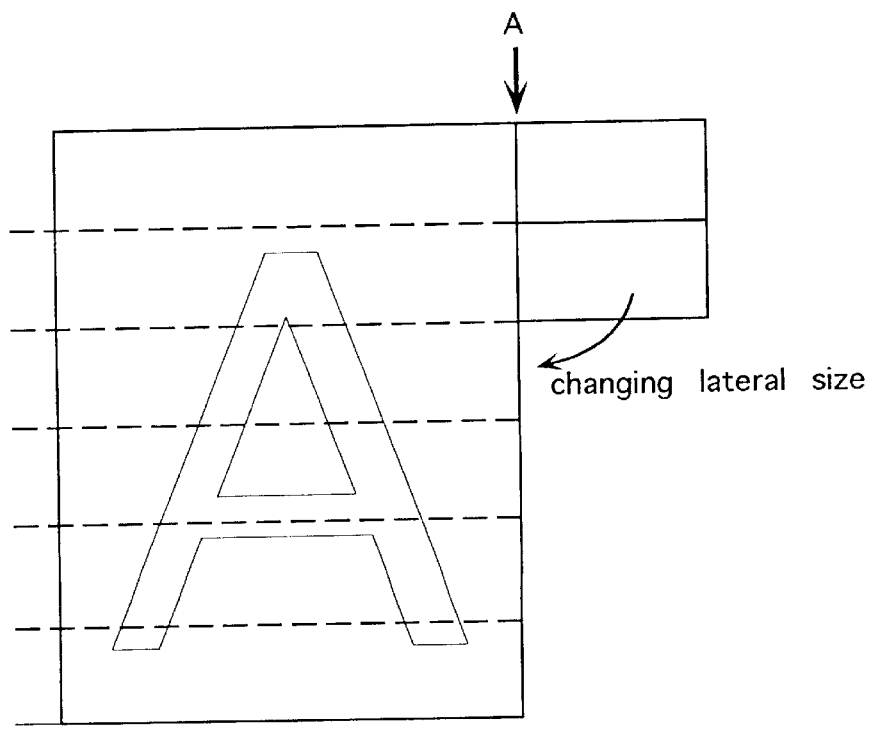
FIG. 21 shows band-division of the input image memory in the memory unit and change in a lateral band size according to the original size.

For example, as shown in FIG. 21, the input memory size is divided into laterally extending bands divided from each other in the longitudinal direction, and the lateral size of the divided bands (these divided units will be called "bands" hereinafter) is reduced during input of the image to the input image memory 302.

Figure 22:
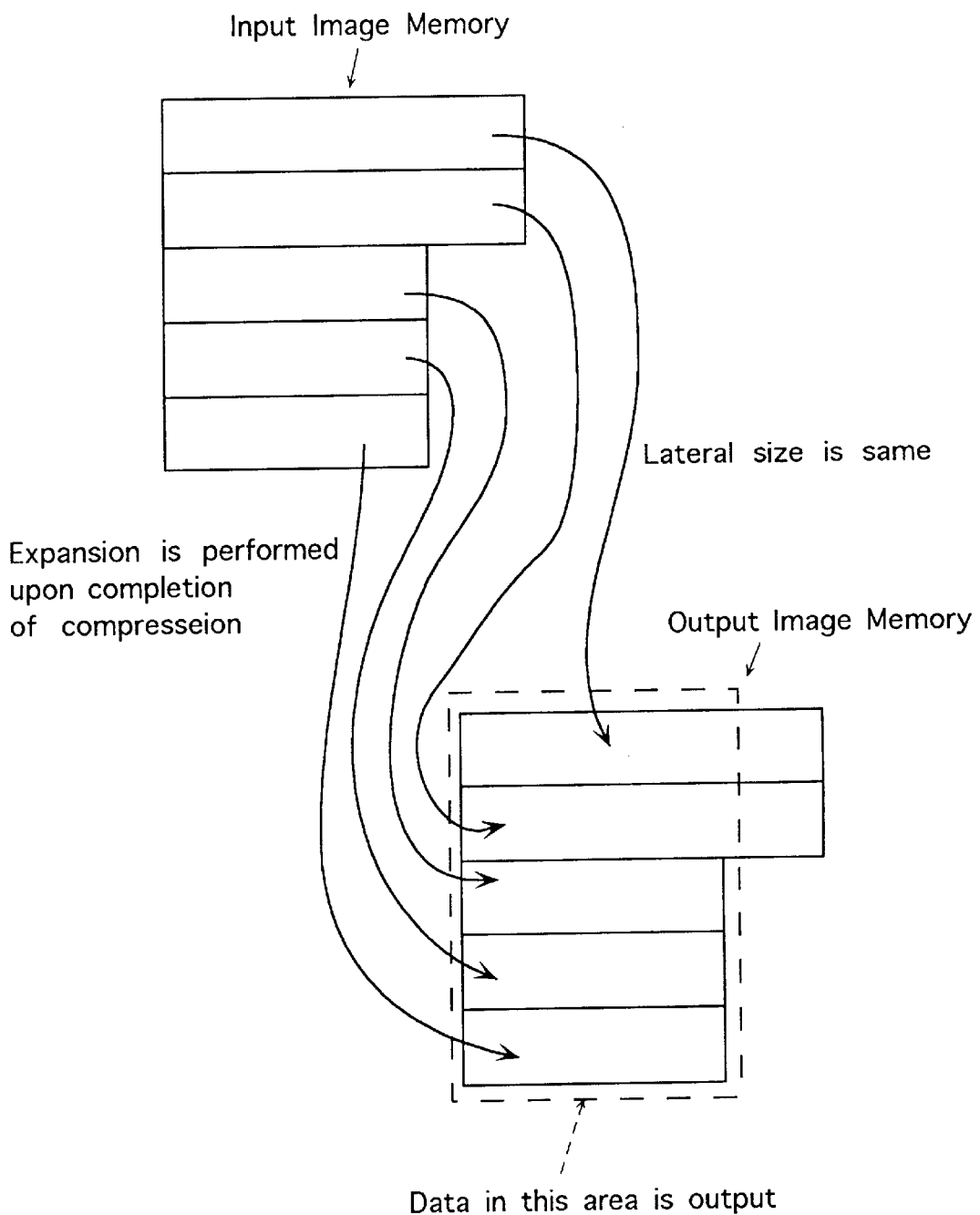
FIG. 22 shows a controlled state of an output image memory in the memory unit corresponding to the input image memory.

At the expanding side, the image formed of the compressed bands can be expanded band by band, so that the output image memory 303 is controlled similarly to the input image memory 302 (see FIG. 22). In this case, the output image memory 303 can be reduced in lateral size during the processing, as can be done in the input image memory 302. Therefore, the problem of the above item (1) can be overcome, and the problem of the above item (2) can be also overcome, because the memory at the output side can be also reduced.

In order to overcome the above problems, an intended operation can be performed with the input and output image memories 302 and 303, each of which has the memory for one page. However, this embodiment employs the structure in which they can operate also as band buffers.

Figure 23:
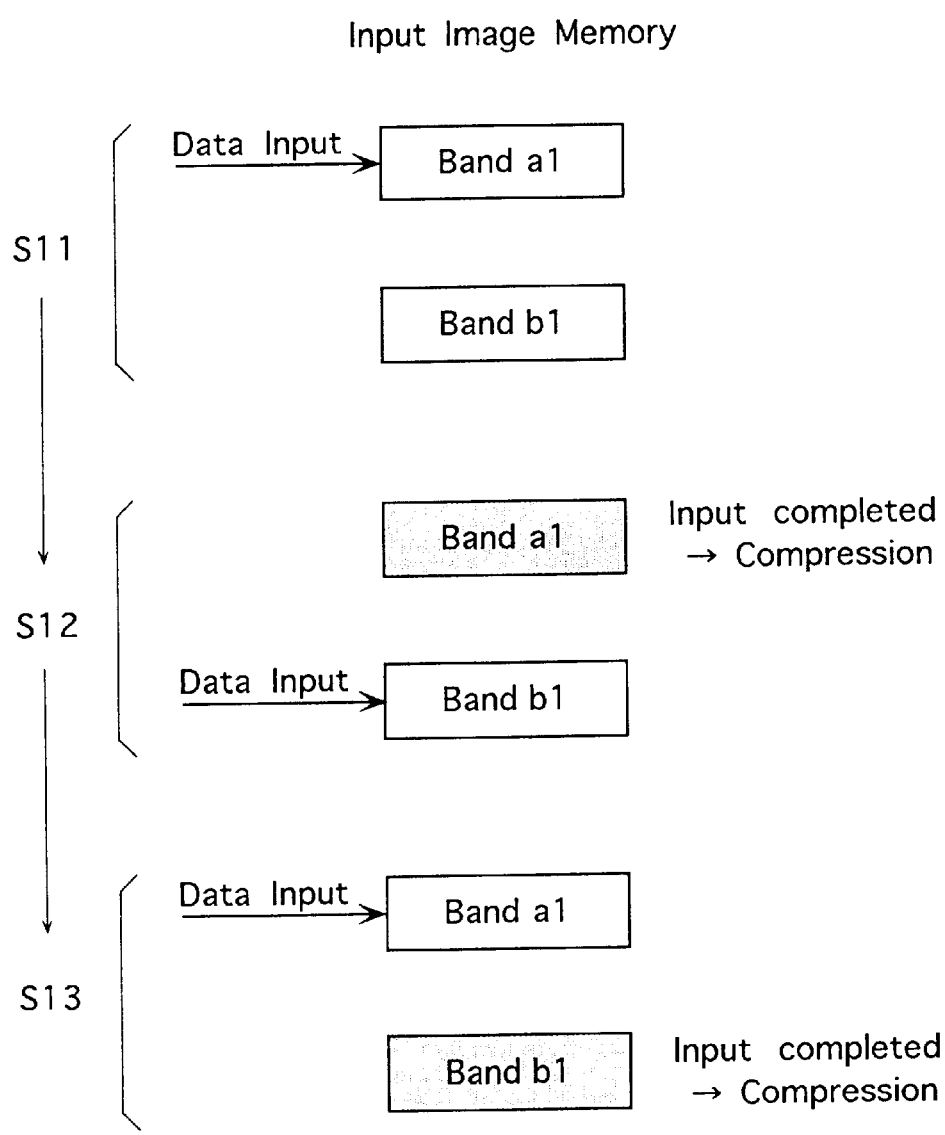
FIG. 23 shows a band operation of the input image memory.

FIG. 23 shows a band operation of the input image memory 302. First, an image is input to a band a1 (step S11). When the band a1 is filled with the supplied image, the input signal (image data D1 sent from the data bus) is sent to a band b1, and the image at band a1 is compressed by the compressor 304 and is transferred to the code memory 306 (step S12). When the band b1 is filled with the image, the input signal is switched toward the band a1 side, and the image at the band b1 side is compressed (step S13). This operation is repeated for further processing. A compression speed of the compressor 304 is higher than a speed of supply of the input signal (image data D1 sent through the data bus) produced by scanning the original.

Figure 24:
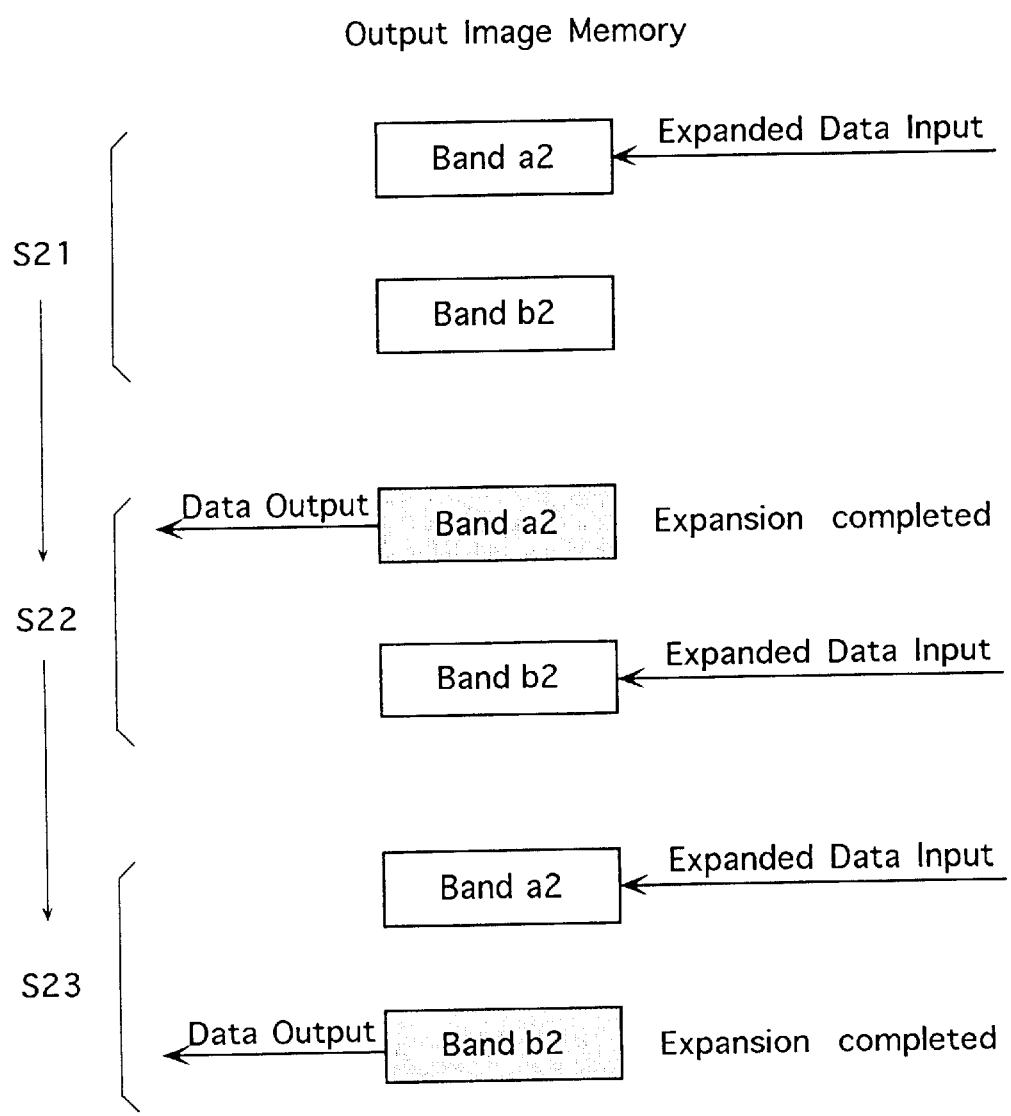
FIG. 24 shows a band operation of the output image memory.

FIG. 24 shows a band operation of the output image memory 303. First, expansion is performed on a band a2 (step S21). When the image is expanded and the band a2 is filled with the same, output of the image data D3 to the bus starts. At this time, the band b2 is empty, so that the image is expanded into this band b2 (step S22). When the output from the band a2 is completed, the band for output is switched to the band b2 side because the expanded image is present at the band b2, and the image is expanded at the band 2a side (step S23). These operations are repeated for further processing. An expansion speed of the expander 305 is faster than the output speed of the image data D3 to the data bus.

Since the expansion can be performed as long as the compressed image is present, the expanding processing can be performed with less load by reserving the band for performing the expansion as long as an empty area is present in the output image memory 303, although expanding process with two bands have been described with reference to FIGS. 23 and 24.

As already described, the lateral memory size decreases during the processing, so that an available memory area can be increased.

However, the band operation cannot be performed at the output image memory 303 side in some cases. As already described, the rotary unit 307 may operate to perform the output at an angle other than 0 degree. In this case, reading on the output image memory 303 must be performed in the longitudinal direction, so that the band operation cannot be performed. Therefore, an area for one page is reserved on the output image memory 303.

In this case, the area is reserved on the memory as large as possible, and expansion is performed successively.

Figure 25:
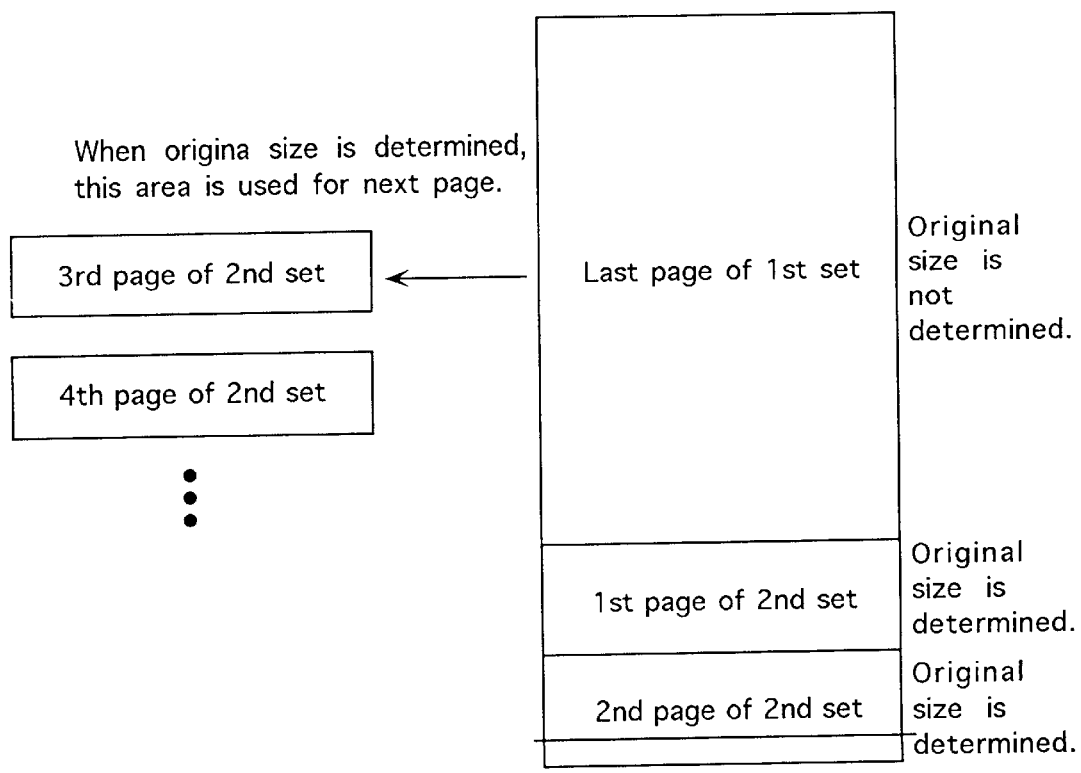
FIG. 25 shows control of allocation of expansion areas for printing a second copy in an electronic sort mode.

In the electronic sort mode described above, when a second set of documents are to be printed after printing the first set of documents, a page length of the last page in the first set cannot be determined, so that a large area is reserved, and the expansion area cannot be reserved in many cases, in spite of the fact that the image for the second set is already present (see FIG. 25).

In this case, therefore, the final unnecessary area for the first set is released and is used as an area for subsequent expansion of a page, when the original size is determined.

In connection with the contents described above, description will be given on the control of the memory unit 30 by the CPU 106.

In the copying operation, an operator presses the start key 896 at the operation panel OP, whereby a sequence of a series of operations such as image reading, printing and others starts. The control for these operations are performed in the same manner as that in the conventional digital copying machine. Therefore, description will be primarily given on processing at the memory unit 30 for read, compression, expansion and output (print).

Figure 26:
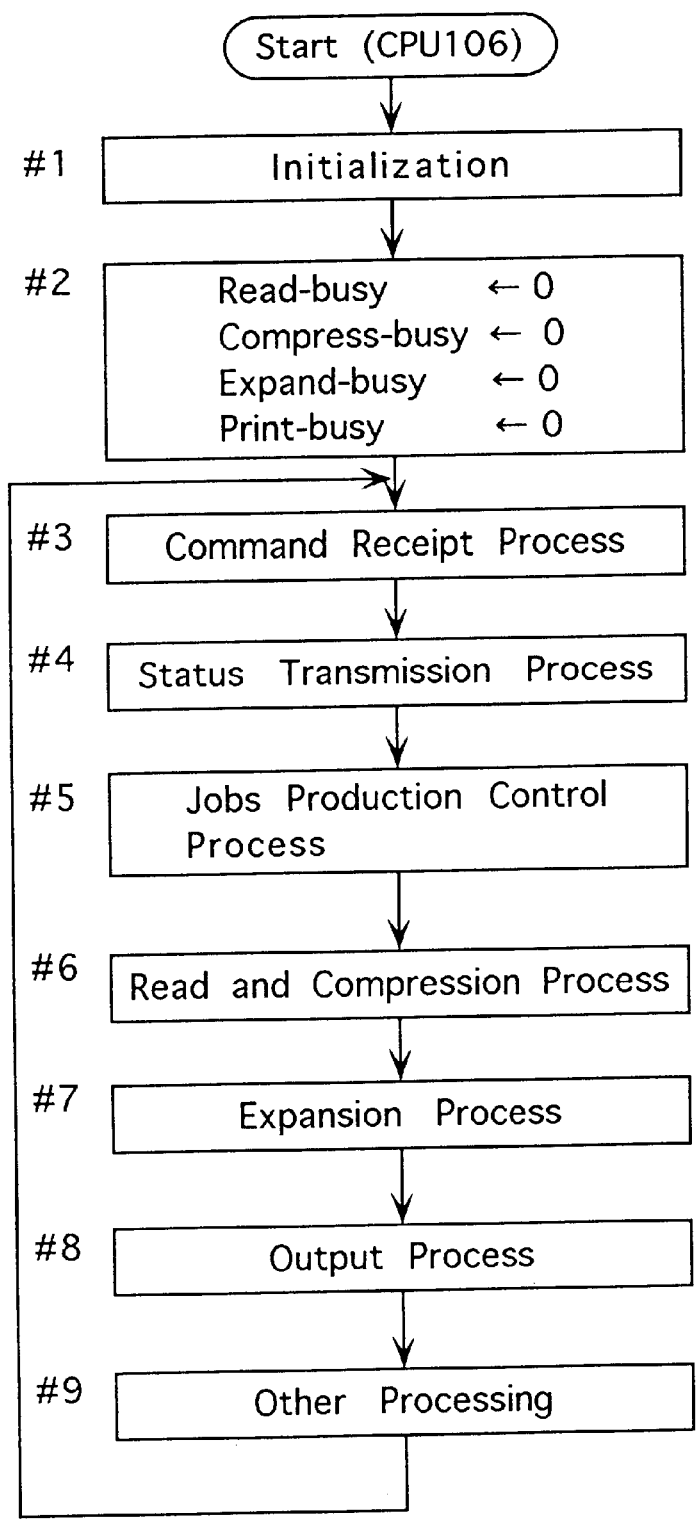
FIG. 26 is a flowchart showing a main routine of a control operation of the memory unit.

FIG. 26 is a flowchart showing a main routine of control operation in the memory unit 30. Upon power-on, internal states and various registers are first initialized (#1). Flags "Read-busy", Compress-busy", "Expand-busy" and "Print-busy" indicative of the states of read, compress, expand and print are initialized to "0" (#2).

Subsequently, communication with the other CPUs are performed (command receipt #3, status transmission #4), and internal jobs are produced in accordance with designation of various modes (#5). By the production of the jobs, read and compression (#6), expansion (#7), output (#8) and other processing (#9) are performed, and the operations starting from the step #3 are repeated.

Figure 27:
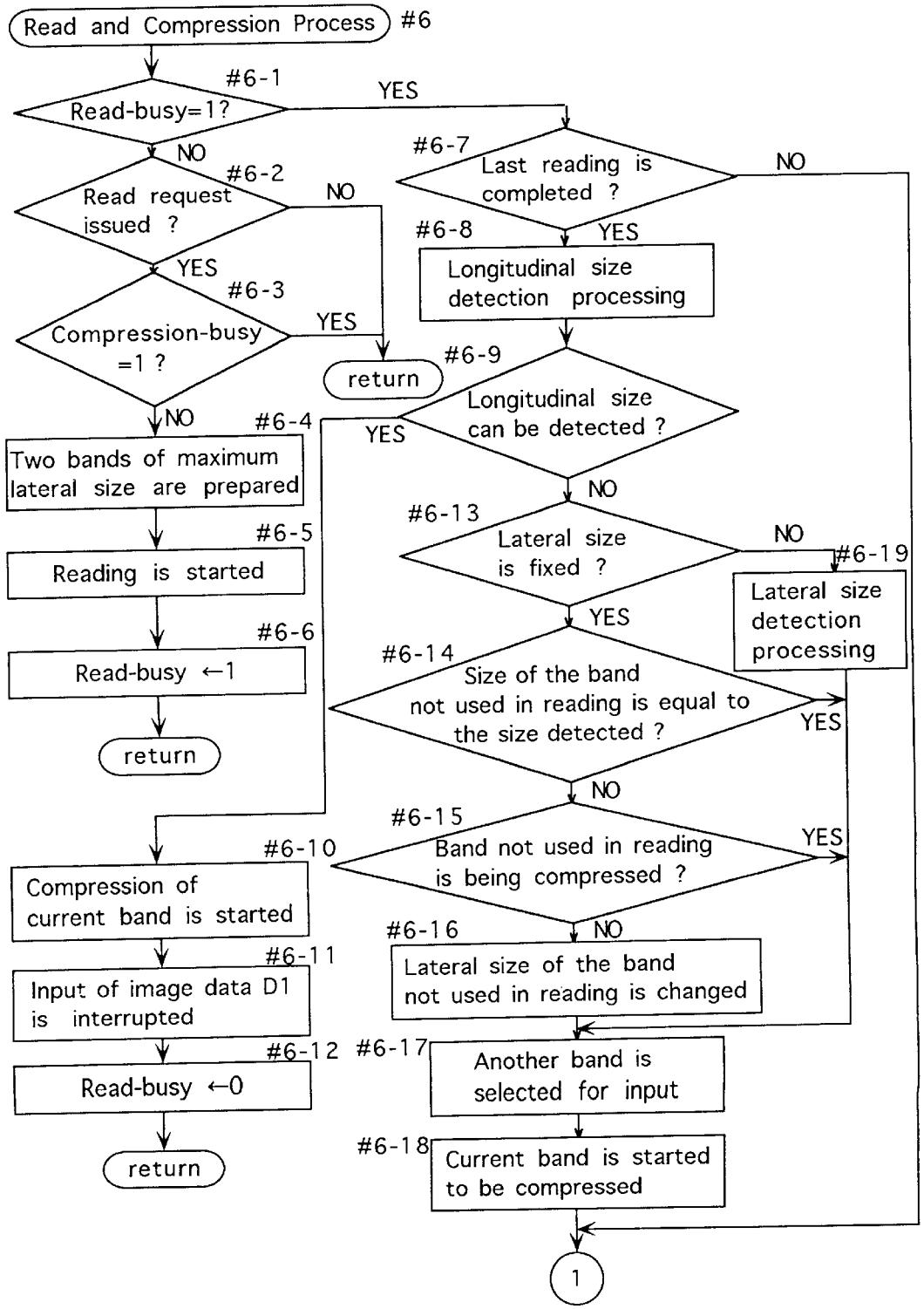
FIG. 27 is a flowchart showing a portion of reading and compression routines.
Figure 28:
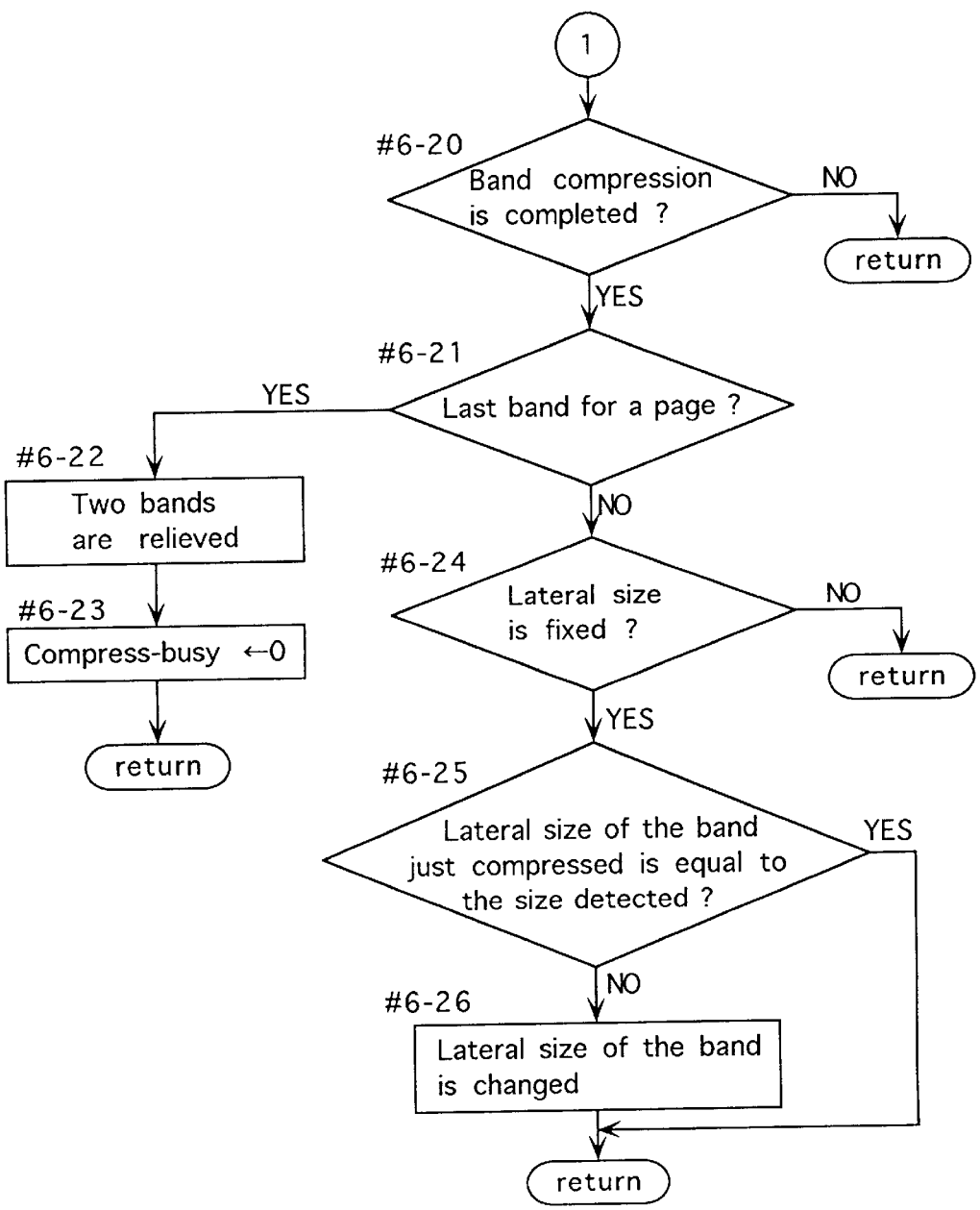
FIG. 28 is a flowchart showing the other portion of the reading and compression routines.

FIGS. 27 and 28 are flowcharts showing read and compression routines (#6).

In this processing, the flag "Read-busy" indicative of whether the read state is attained or not is determined (#6-1). If not read state, it is determined whether the read request is issued or not (#6-2). If issued, it is determined whether the compression is completed or not (#6-3). If the flag "Compress-busy" is "0" , two bands are initially prepared (#6-4). At this stage, the original size is not determined, because the reading is not yet started. Therefore, the maximum lateral width is prepared for the time being (in this example, processing is performed band by band as described above). Reading for one band starts (#6-5). Since the reading starts, the status flag "Read-busy" is set to "1" (#6-6).

When the reading state is found at step #6-1 (flag "Read-busy" is "1"), it is determined that the reading is being performed, so that it is determined whether the last reading is completed or not (#6-7). This determination of completion of reading is performed by reading the register representing the state of the hardware.

If the reading has been completed (#6-7, YES), the longitudinal size of the original is detected (#6-8). Thus, it is determined whether the boundary (e.g., boundary B in FIG. 19) can be detected or not. If detected (#6-9, YES), which means that a trailing edge of the original is detected, so that compression of the current band starts (#6-10). Since the image data D1 is required no longer, input for the same is interrupted (#6-11), and the read-busy state is reset (flag "Read-busy" is reset to "0") (#6-12).

If the longitudinally trailing edge of the original is not detected at step #6-9, which means that the original is not yet fully read, so that the processing continues.

It is determined whether the lateral size of the original is fixed or not (#6-13). If not fixed, the lateral size of the original is detected (#6-19). In the example of the original shown in FIG. 19, the boundary A is detected. If the lateral size of the original is fixed at step #6-13, it is determined whether or not the lateral size of the opposite band not used in current reading is equal to the fixed size. If not equal (#6-14, NO) and compression is not being performed at this band (#6-15, NO), the lateral size of the band is changed (#6-16). The lateral size of the last band at which reading is completed cannot be changed because the image compression is not completed.

The opposite band is selected for the input signal of the read image (#6-17), and compression at the current band starts (#6-18).

When the band compression is completed (#6-20, YES), it is determined whether it is the last band for one page or not (#6-21). If it is the last band for one page (#6-21, YES), the compression of this page is completed, so that the two bands are relieved (#6-22), and the compression state flag "Compress-busy" is reset to "0" (#6-23).

If not the last band (#6-21, NO), it is determined whether the lateral size is fixed or not (#6-24). If the last compressed band has a different lateral size, the lateral size of the band is adjusted (#6-25, #6-26).

Figure 29:
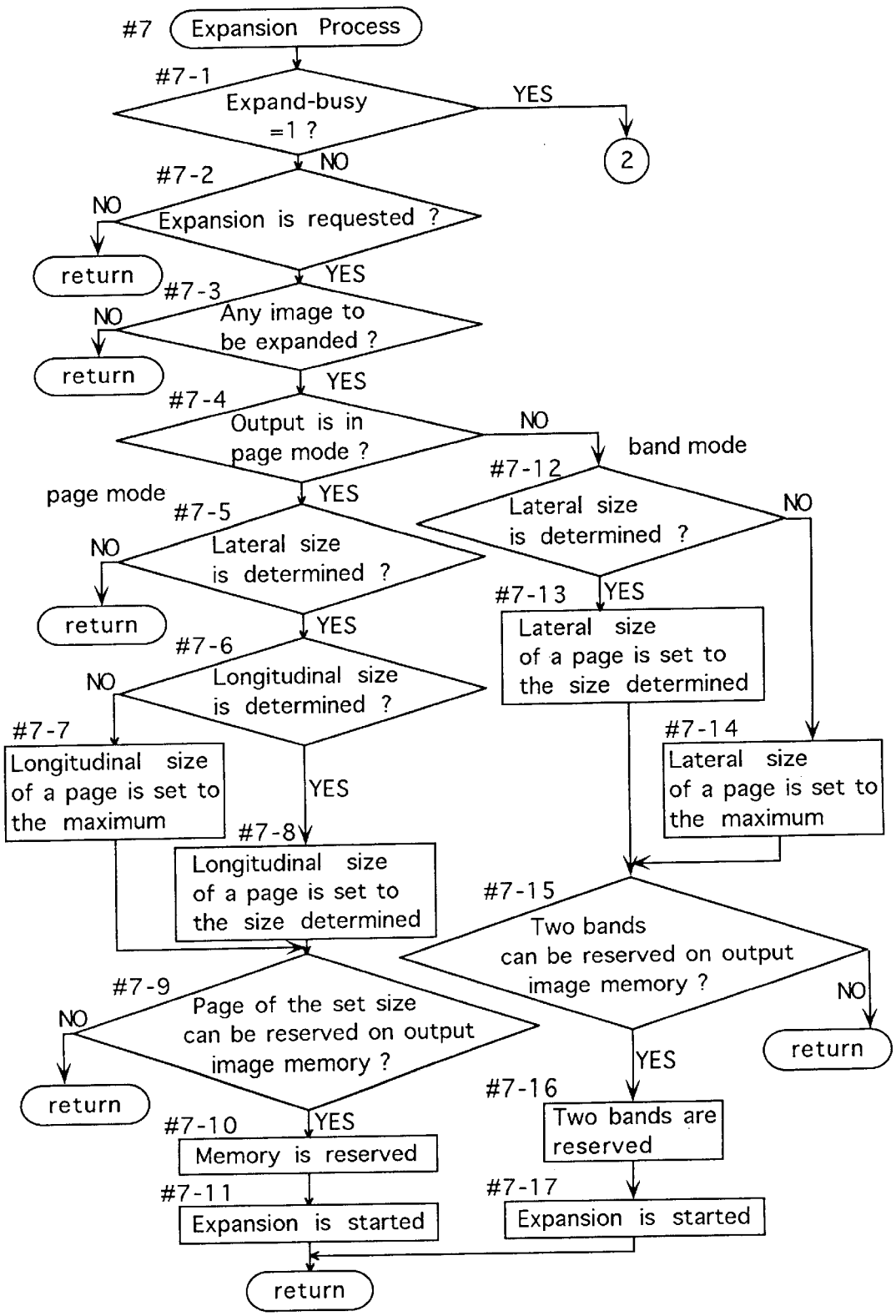
FIG. 29 is a flowchart showing a portion of an expansion routine.
Figure 30:
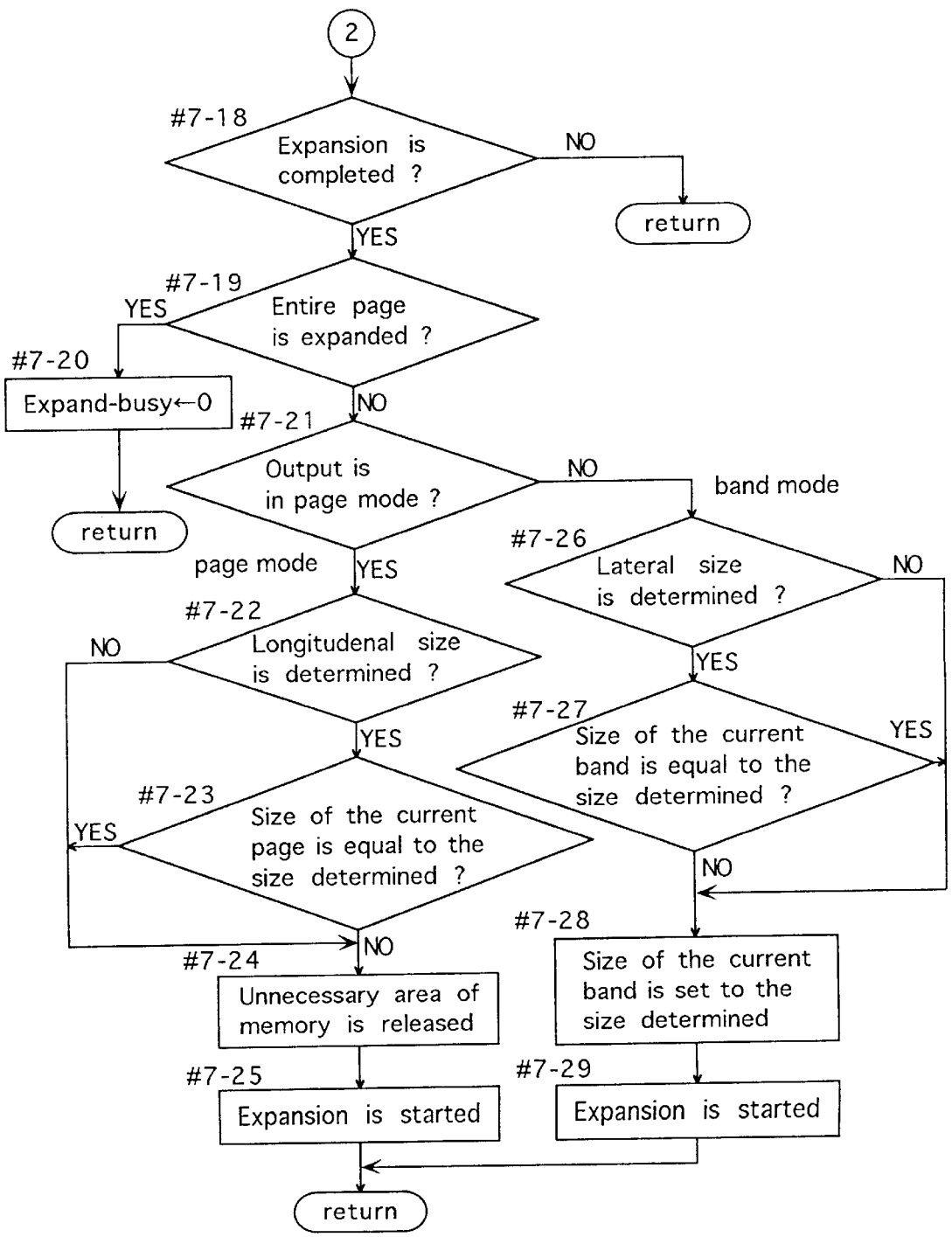
FIG. 30 is a flowchart showing the other portion of the expansion routine.

FIGS. 29 and 30 are flowcharts showing the expanding routine (#7).

In this processing, the flag "Expand-busy" indicative of expansion is first checked. If not expanding state (#7-1, NO), it is determined whether a request for expansion is issued (#7-2). If requested, it is determined whether the image to be expanded is present or not (#7-3), and the expansion starts, if any.

It is determined whether the current mode is a mode for reserving the memory page by page or a mode for reserving the memory band by band (#7-4). If the rotation processing is to be performed, the page mode is selected. In the page mode, it is determined whether the longitudinal size is fixed or not (#7-6) if the lateral size has been fixed (#7-5). If the longitudinal size is determined, the determined size is employed (#7-8), and, if not determined, the maximum length is employed (#7-7). (If it is allowed that the lateral size cannot be changed during the processing, it is not necessary to determine the state of the lateral size.)

Based on the determined sizes, it is checked whether the current page can be reserved on the output image memory 303 (#7-9). If possible, it is reserved (#7-10), and the expansion starts at the same (#7-11).

Also in the band mode, the lateral size of the band is fixed (#7-12, #7-13) if the lateral size is determined. If not determined, the maximum length is employed (#7-14), and subsequently, two bands are reserved (#7-15) to start the expansion (#7-17).

When the expansion is completed (#7-18), it is determined whether the entire page is expanded or not (#7-19). If entirely expanded, the expanding state is relieved (flag "Expand-busy" is reset to "0") (#7-20). If not, and if the mode is the page mode (#7-21, YES), adjustment of longitudinal size is performed (#7-22–#7-24). If the mode is the band mode, adjustment of the lateral size is performed (#7-26–#7-28), and the expansion starts (#7-25 or #7-29).

Figure 31:
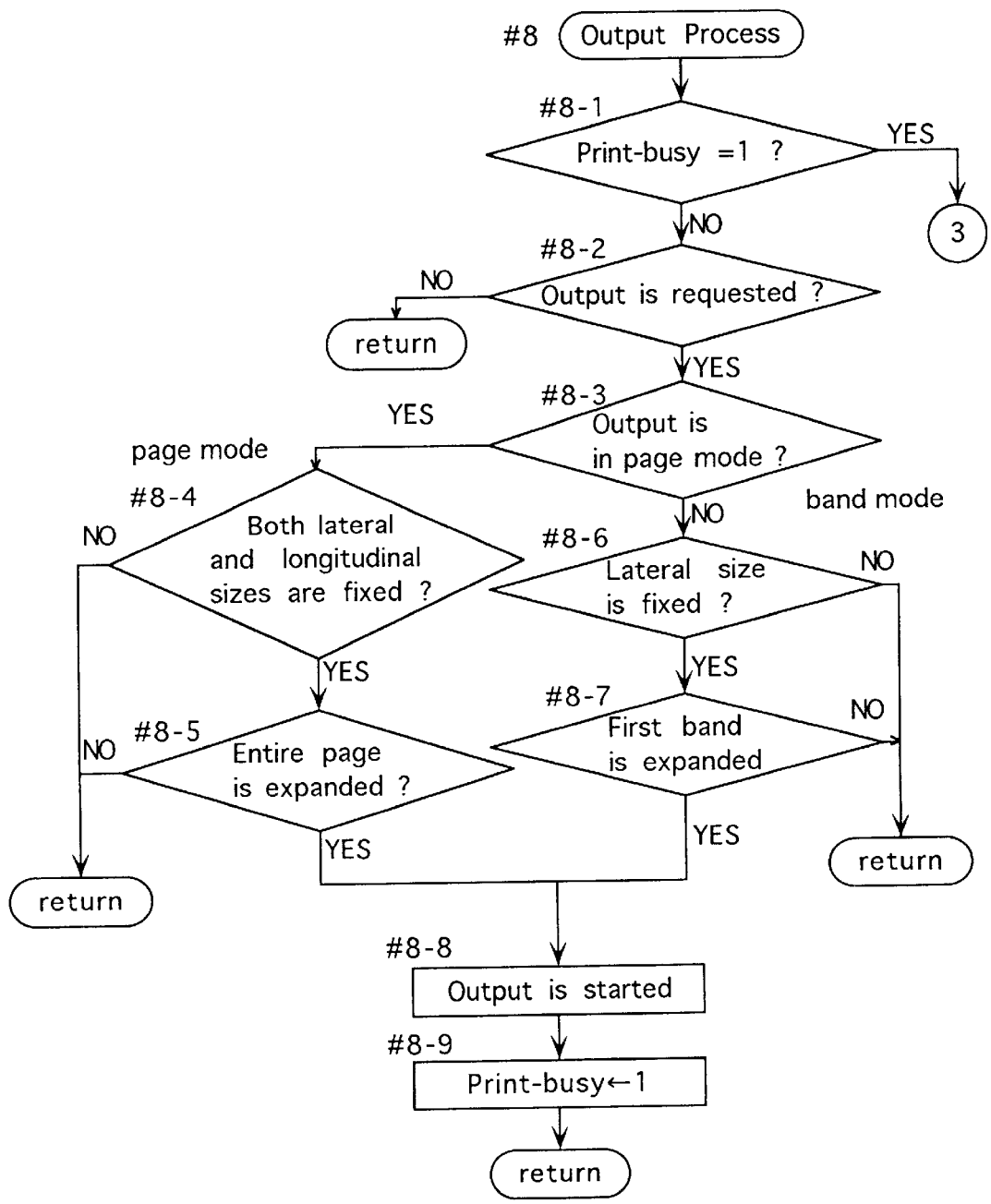
FIG. 31 is a flowchart showing a portion of an output routine.
Figure 32:
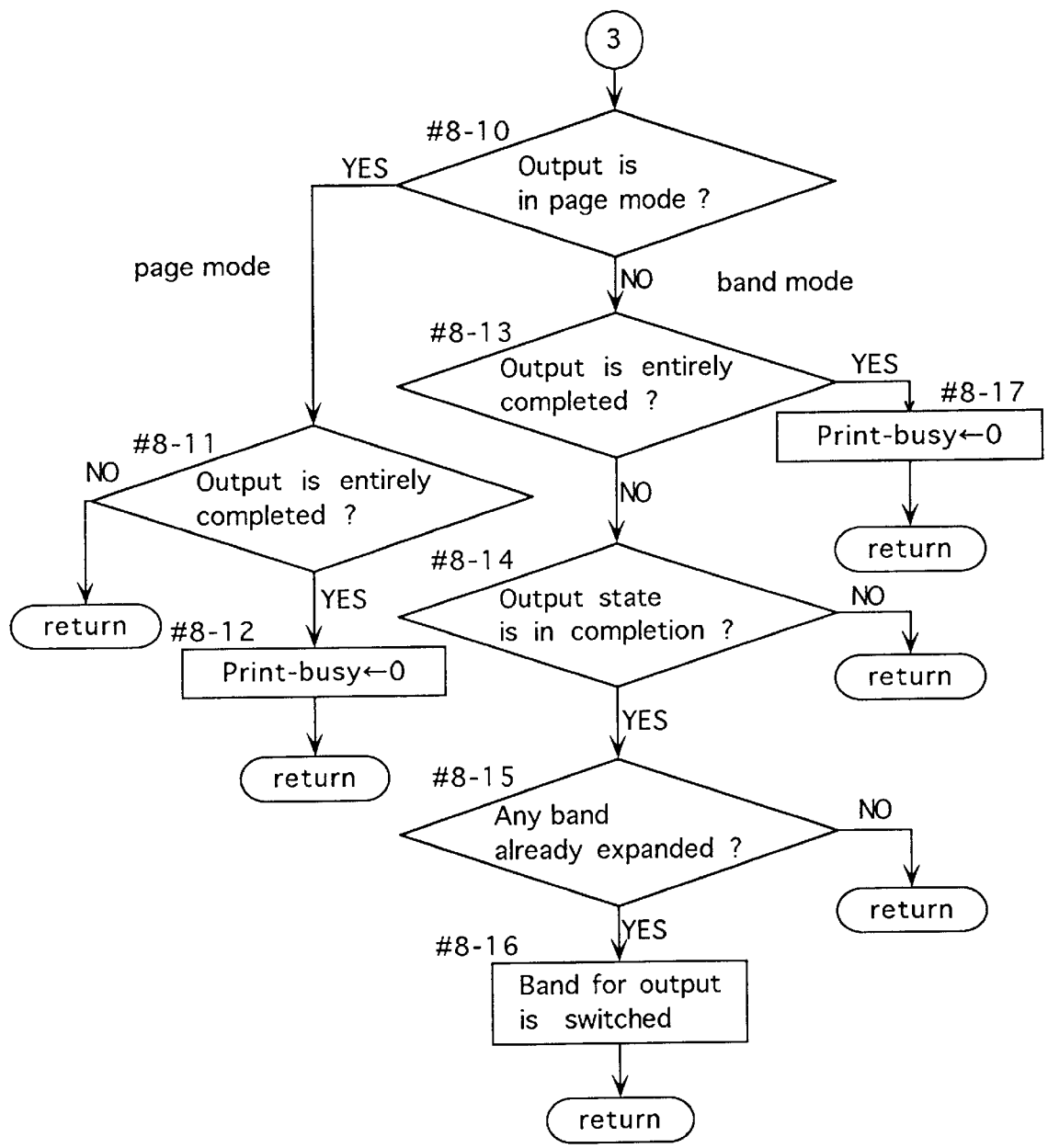
FIG. 32 is a flowchart showing the other portion of the output routine.

FIGS. 31 and 32 are flowcharts showing the output routine (#8).

In this processing, if the flag "Print-busy" indicative of the output state is not "1" (output is not being performed) (#8-1, NO) and if the output is requested (#8-2, YES), the output mode is confirmed and the output starts (#8-3).

In the page mode, when the longitudinal and lateral sizes of the original are fixed (#8-4, YES) and the expansion of entire page is completed (#8-5, YES), the output starts (#8-8), and the flag "Print-busy" is set to "1" indicating that the output is being performed (#8-9).

In the band mode, when the lateral size of the original is determined (#8-6) and the expansion of the first band is completed (#8-7, YES), the output starts at this point of time (#8-8, #8-9).

During printing (#8-1, YES), it is determined whether the mode is the output page mode or not (#8-10). If it is the page mode, and if the output is entirely completed, the flag "Print-busy" is reset to "0" (#8-12). If the output is not completed, the operation returns (#8-11, NO).

If it is the band mode, the flag "Print-busy" is reset to "0" (#8-17) when the output is completed (#8-13, YES). If not completed (#8-13, NO), completion of the output is waited (#8-14, YES). If the expanded band is present (#8-15, YES), the output band is switched (#8-16).

Although an example of the embodiment has been described, the processing for original size detection described above can be applied to such a case that, in the longitudinal direction, the original length cannot be determined before the start of reading, e.g., of documents having different sizes in the mode of reading the image by moving the original without moving the reading means.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing device comprising:

an input image memory for temporarily storing digital image data representing pixels;

a writing means for storing said image data serially supplied from an upstream unit to said input image memory in order of input;

a reading means for performing reading operations for the image data already stored in said input image memory in parallel with storing of new image data in said input image memory by said writing means, said reading means reading a specified quantity of the image data from the input image memory during each reading operation with said specified quantity including a plurality of lines of the image data; and an image compressing means for compressing said image data read by said reading means.

2. An image data processing device according to claim 1, further comprising:

time measuring means for measuring a required time for compression of said specified quantity of image data by said image compressing means; and specified quantity control means for reducing said specified quantity when said required time is longer than a constant value.

3. An image data processing device according to claim 1, further comprising:

a compressed image holding memory for holding said image data compressed by said image compressing means.

4. The image data processing device according to claim 1, further comprising:

an image expanding means for expanding said image data compressed by said image compressing means;

an output image memory for storing the image data expanded by said image expanding means;

a drawing means for storing the image data expanded by said image expanding means in said output image memory in order of expansion; and an image data output means for reading the image data from said output image memory in order of arrangement of pixels and outputting the read image data to a downstream unit, wherein when said image data for a plurality of pages is to be output, a series of operations of expanding the compressed image data and storing the expanded compressed image data in said output image memory are performed in parallel to reading of the image data from said output image memory by said image data output means.

5. A digital copying machine provided with the image data processing device which comprises:

an input image memory for temporarily storing digital image data representing pixels;

a writing means for storing said image data serially supplied from an upstream unit to said input image memory in order of input;

a reading means for performing reading operations for the image data already stored in said input image memory in parallel with storing of new image data in said input image memory by said writing means, said reading means reading a specified quantity of the image data from the input image memory during each reading operation with said specified quantity including a plurality of lines of the image data; and an image compressing means for compressing said image data read by said reading means.

6. An image data processing device comprising:

an input image memory for temporarily storing digital image data representing pixels and being divided into a plurality of blocks, each block having an address space for a plurality of lines;

a writing means for storing said image data serially supplied from an upstream unit to said input image memory in order of input;

a reading means for performing reading operations of the image data already stored in a block of said input image memory in parallel with storing of new image data to another block of said input image memory by said writing means every time the image data is completely stored in the block of said input image memory, said block of said input image memory including a plurality of lines of the image data, and said reading means reading all the data of a respective block in each reading operation; and an image compressing means for compressing said image data read by said reading means.

7. An image data processing device according to claim 6, further comprising:

a time measuring means for measuring a required time for compression of the image data stored in the block of said input image data; and a control means for changing a size of the block based on the required time.

8. An image data processing device according to claim 6, further comprising:

a compressed image holding memory for storing the image data compressed by said image compressing means.

9. An image data processing device according to claim 6, further comprising:

an image expanding means for expanding said image data compressed by said image compressing means;

an output image memory for storing the image data expanded by said image expanding means;

an image data output means for reading the image data from said output image memory in order of arrangement of pixels and outputting the same to a downstream unit, when said image data for a plurality of pages is to be output, a series of operations of expanding the compressed image data and storing the same in said output image memory are performed in parallel to reading of the image data from said output image memory by said image data output means.

10. An image data processing device according to claim 6, further comprising:

a management table memory for storing a compressed data management table including information of blocks.

11. An image data processing device comprising:

an input image memory which is divided into a plurality of blocks including a first block and a second block, each block having an address space for a plurality of lines;

a writing means for storing said image data serially supplied from an upstream unit to said input image memory in order of input, the first and second block each storing a plurality of lines of the image data when the image data is completely stored in each of the blocks;

a reading means for performing reading operations, a reading operation including starting reading of the image data already stored in the first block of said input image memory in parallel with storing of new image data to the second block of said input image memory by said writing means when the image data is completely stored in the first block of said input image memory, and said reading means reading all the data of a respective block in each reading operation; and an image compressing means for compressing said image data read by said reading means.

12. An image data processing device according to claim 11, further comprising:

a time measuring means for measuring a required time for compression of the image data stored in the first block of said input image data; and a control means for changing a size of the second block based on the required time.

* * * * *